(12) United States Patent
Kaynig-Fittkau et al.

(10) Patent No.: US 11,386,685 B2
(45) Date of Patent: Jul. 12, 2022

(54) MULTIPLE CHANNELS OF RASTERIZED CONTENT FOR PAGE DECOMPOSITION USING MACHINE LEARNING

(71) Applicant: Adobe Inc., San Jose, CA (US)

(72) Inventors: Verena Sabine Kaynig-Fittkau, Cambridge, MA (US); Smitha Bangalore Naresh, Sudbury, MA (US); Shawn Alan Gaither, Raleigh, NC (US); Richard Cohn, Newton, MA (US); Paul John Asente, Redwood City, CA (US); Eylon Stroh, San Carlos, CA (US); Emily Seminerio, Medfield, MA (US)

(73) Assignee: Adobe Inc., San Jose, CA (US)

( * ) Notice: Subject to any disclaimer, the term of this patent is extended or adjusted under 35 U.S.C. 154(b) by 319 days.

(21) Appl. No.: 16/655,363

(22) Filed: Oct. 17, 2019

(65) Prior Publication Data

US 2021/0117666 A1   Apr. 22, 2021

(51) Int. Cl.
| | |
|---|---|
| *G06V 30/413* | (2022.01) |
| *G06N 20/00* | (2019.01) |
| *G06V 30/412* | (2022.01) |
| *G06V 30/414* | (2022.01) |

(52) U.S. Cl.
CPC ........... *G06V 30/413* (2022.01); *G06N 20/00* (2019.01); *G06V 30/412* (2022.01); *G06V 30/414* (2022.01)

(58) Field of Classification Search
CPC .......... G06K 9/00456; G06K 9/00449; G06K 9/00463; G06K 9/6272; G06N 20/00; G06N 3/0454; G06N 3/08
See application file for complete search history.

(56) References Cited

U.S. PATENT DOCUMENTS

| | | |
|---|---|---|
| 5,307,266 A | 4/1994 | Hayashi et al. |
| 7,346,838 B2 | 3/2008 | Martyn et al. |
| 8,208,737 B1 | 6/2012 | Ie |
| (Continued) | | |

OTHER PUBLICATIONS

Yang, et al., "Learning to Extract Semantic Structure from Documents Using Multimodal Fully Convolutional Neural Networks," The IEEE Conference on Computer Vision and Pattern Recognition (CVPR), 2017 16 pages.

(Continued)

*Primary Examiner* — Christopher M Brandt
(74) *Attorney, Agent, or Firm* — Finch & Maloney PLLC

(57) ABSTRACT

Techniques are provided for identifying structural elements of a document. One Methodology includes generating a first channel of rasterized content by rasterizing a full page of the document and generating one or more additional channels of rasterized content from the page of the document by rasterizing one or more corresponding content types from the page of the document. Each of the one or more additional channels includes a specific type of content that is different from each of the other one or more additional channels. The methodology further includes inputting the first channel of rasterized content and the one or more additional channels of rasterized content into a machine learning (ML) model. The methodology continues with determining location and classification for each of a plurality of structural elements on the page of the document using the ML model.

20 Claims, 22 Drawing Sheets

(56) References Cited

U.S. PATENT DOCUMENTS

| | | |
|---|---|---|
| 2004/0205081 A1* | 10/2004 | Chao .................. G06F 3/1284 |
| 2009/0327210 A1 | 12/2009 | Liu |
| 2013/0124979 A1 | 5/2013 | Chang et al. |
| 2013/0343658 A1 | 12/2013 | Déjean |
| 2017/0337443 A1 | 11/2017 | Kolton et al. |
| 2019/0049987 A1* | 2/2019 | Djuric .................. G06K 9/6288 |
| 2020/0019769 A1* | 1/2020 | Leibovitz ................ G06N 3/08 |
| 2021/0157975 A1 | 5/2021 | Gelosi |

OTHER PUBLICATIONS

Notice of Allowance received in U.S. Appl. No. 16/655,365 dated Jan. 3, 2022, 9 pages.

\* cited by examiner

602

6

2 This is a heading

*This is a subheading*

This is standard document text. Check out the following list of items:

- List item 1
- List item 2
- List item 3
- List item 4

*This is another subheading*

More standard document text. Check out the flowchart figure below:

This represents more text that continues on to the next page. This represents more text that continues on to the next page. This represents more text that continues on to the next page. This represents more text that continues on to the next page. This represents more text that continues on to the next page. This represents more text

FIG. 6A

MULTIPLE CHANNELS OF RASTERIZED CONTENT FOR PAGE DECOMPOSITION USING MACHINE LEARNING

RELATED APPLICATION

This application is related to U.S. patent application Ser. No. 16/655,365, entitled "Document Structure Identification Using Post-processing Error Correction" filed concurrently with this application.

FIELD OF THE DISCLOSURE

This disclosure relates generally to the field of digital document processing, and more particularly, to techniques for accurately identifying document structures using a machine learning model.

BACKGROUND

Conventional scanning of physical documents into electronic documents and OCR techniques on electronic image-based documents (like .pdf) have a limited ability to automatically detect various structural elements of the physical and electronic documents, particularly with respect to any electronic documents that have no intrinsic data regarding their structural elements. As a result, there may be errors in identifying the classification or location of certain structural elements of the given document. In some cases, a user can manually input the classification and/or location of certain structural elements in the electronic document, but this is costly and inconvenient, especially for large documents. Therefore, complex and non-trivial issues associated with identifying structural elements of electronic documents remain due to the limitations of these existing techniques.

SUMMARY

Techniques are provided for identifying structural elements of a document. In one embodiment, a methodology includes generating a first channel of rasterized content by rasterizing a full page of the document, and generating one or more additional channels of rasterized content from the page of the document by rasterizing one or more corresponding content types from the page of the document. Each of the one or more additional channels includes a specific type of content that is different from each of the other one or more additional channels. The methodology further includes inputting the first channel of rasterized content and the one or more additional channels of rasterized content into a machine learning (ML) model. The methodology continues with determining location and classification for each of a plurality of structural elements on the page of the document using the ML model based at least on the first channel of rasterized content and the one or more additional channels of rasterized content. In some example cases, the one or more additional channels of rasterized content include second, third and fourth channels, and rasterizing the one or more corresponding content types comprises at least two of: rasterizing text structures from the page of the document to provide the second channel of rasterized content, rasterizing graphic structures from the page of the document to provide the third channel of rasterized content, and rasterizing image structures from the page of the document to provide the fourth channel of rasterized content. In some cases, the methodology includes generating one or more other additional channels by rasterizing one or more full pages sequentially after the page of the document, and/or rasterizing one or more full pages sequentially before the page of the document. In some such cases, the inputting further includes inputting the one or more other additional channels into the ML model. Numerous variations will be apparent in light of this disclosure.

BRIEF DESCRIPTION OF THE DRAWINGS

The accompanying drawings are not intended to be drawn to scale.

FIG. 6A shows an example channel of rasterized text structures from the electronic document page of FIG. 5, in accordance with an embodiment of the present disclosure.

DETAILED DESCRIPTION

Figure 1:
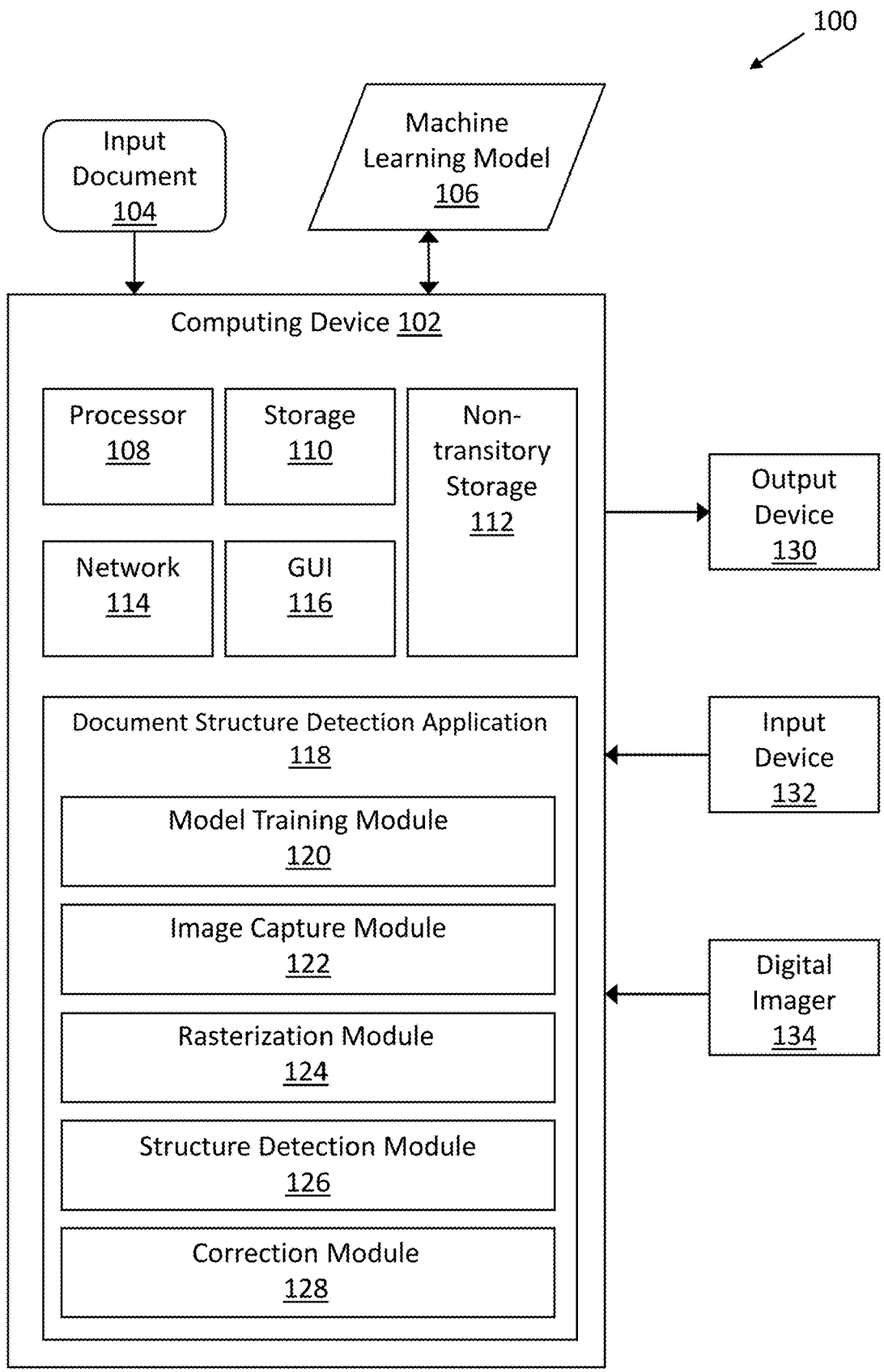
FIG. 1 shows an example system for identifying structural elements of a document using a machine learning model and image processing algorithms, in accordance with an embodiment of the present disclosure.

Techniques are disclosed for identifying various structural elements within an electronic document using a combination of a machine learning (ML) model and image processing algorithms. The image processing includes pre-processing (to prepare the inputs to the ML model) and may further include post-processing (to correct classification errors at the output of the ML model). In an embodiment, a target page of the electronic document is fully rasterized to provide a first channel of rasterized content. Additional channels of specific content types from that target page are also generated, such as one channel for only rasterized text of the target page, another channel for only rasterized images of the target page, and another channel for only rasterized graphics of the target page. In some such cases, one or more full pages just prior to the target page N (such as page N−1 and/or N−2) and/or one or more full pages just after the target page (such as page N+1 and/or N+2) are also rasterized to provide additional channels. In any such cases, all the channels of rasterized content are fed into the ML model to improve the likelihood of correctly identifying the structural elements on each of the pages. Further error correction processing may be performed to correct misclassifications at the output of the ML model. This correction includes using document content spatially adjacent to the misclassified structural element, as will be explained in turn.

Some types of digital documents do not have structural tagging or other intrinsic data regarding its document structural elements (generally, a document that has no ability to be self-aware or otherwise communicate or make known its structural elements, whether actively or passively). Examples of such digital documents include images of documents (or more simply, imaged document), some word processing documents, and some PDF documents, as will be appreciated. In some embodiments, an electronic document, as used herein, can refer to either a digital document that does not have intrinsic data regarding its document structural elements or to a digital document that does have intrinsic data regarding its document structural elements. As used herein, the term "document structural elements" or similarly the "structural elements of a document" refer to any text or figure or object features in the document. Example classifications of document structural elements include headings, list items, tables, figures, body text, and footnotes, to name a few examples. Rasterizing a page of the electronic document refers to any technique that converts all structures, or specific types of structures, on the page (e.g., text, graphics, images, etc.) into a bitmap image of pixels.

A given electronic document may include various classifications of structural elements located on each page of the electronic document. Correctly identifying the locations and classifications of each of the structural elements on a given page has numerous benefits. In one example, the location and/or classification of the structural elements can be used to generate a structural map of each page of the electronic document. In one such example case, the structural map can be used to automatically generate a table of contents and/or a table of figures for the electronic document. More generally, the location and/or classification of the structural elements provided in the structural map can be used by a user to quickly navigate through the electronic document by jumping to various portions of the document based on a desired structural element type. In another such example case, the structural map of each page of the electronic document can be used to determine a different display scheme for the electronic document. The display scheme may be used, for instance, to display the electronic document on a smaller-sized screen and make the electronic document easier to read on the screen. For example, a PDF document could be re-displayed on a smartphone screen by using the display scheme determined from the structural map of each page of the electronic document. Displaying the PDF document using the determined display scheme may involve smoothly wrapping certain heading structures or body text structures to fit the smaller screen width, enabling tables to swipe vertically and horizontally on a smaller screen, hiding footnotes behind reference symbols, collapsing figures or text asides into smaller poster images that can expand when clicked on, and/or suppressing background imagery to improve readability of the text, to name a few examples.

General Overview

Typically, a ML model receives a rasterized full page of an electronic document and detects the various possible structural elements present on the page. However, this can be difficult for certain combinations of structural elements, or for structural elements that partially or fully overlap on the page. For example, a portion of text may be present on the page over a background graphic image. The ML model may classify the text portion correctly but miss the graphic image since it occupied the same space, or vice-versa. In addition, there may be numerous graphics present on a page that interfere with the ability of the ML model to distinguish between different text structures. Thus, there remain a number of non-trivial issues with using an ML model to understand the structure of a given document.

Thus, and in accordance with some embodiments, additional inputs are provided to the ML model that decompose each rasterized page of the electronic document into distinct content channels with each content channel having unique content. Examples of content channels include a channel containing only rasterized text structures from a given page of the document, a channel containing only rasterized graphic structures from the given page of the document, and/or a channel containing only rasterized image structures from the given page of the document. Other example channels can include rasterized images of full pages before and/or after the given page of the document. Each of the channels of rasterized content can be fed as inputs to the ML model to improve classifying and locating the various structural elements on each page of the electronic document.

The techniques may be embodied in devices, systems, methods, or machine-readable mediums, as will be appreciated. According to one embodiment of the present disclosure, a system is provided that includes a machine learning (ML) model and a rasterization module. The ML model is used to identify the structural elements of an electronic document based on deterministic algorithms subsequent to a learning phase to train the model. The learning phase may involve feeding the ML model hundreds or thousands or more electronic documents to train the ML model how to identify particular structures. However, the output of such trained ML models can still suffer from various errors with respect to one or both of the identified location and classification of certain structural elements in the electronic document. As a result, portions of the electronic document may be misclassified, or not classified at all, leading to issues with downstream processing of the electronic document. Accordingly, a pre-processing technique is disclosed herein that provides the ML model with not only a rasterized version of the full page being targeted, but also rasterized portions of that page (and/or rasterized content of neighboring pages) as separate inputs. According to some embodiments, the rasterization module is designed to rasterize a page of the document and rasterize one or more specific types of content from the page of the document, where each of the channels includes content that is different from each of the other channels. The rasterized full page of the document and the rasterized one or more additional content types are inputted into the ML model, and the ML model determines location and classification for each of a plurality of structural elements on the page of the document based at least on the rasterized page of the document and the one or more additional channels of rasterized content. In other embodiments, the document can simply be stored, along with data representing the location and classification of the structural elements (wherein said data may be, for example, in the form of one or more structural maps or some other form usable by an application in which the document is opened). In such cases, the methodology effectively generates smart documents from relatively more simple electronic documents that had no intrinsic data indicative of the structural features making up that document. Any number of such use cases or applications will be appreciated in light of this disclosure. By way of an example, any number of non-transitory machine-readable mediums (e.g., embedded memory, on-chip memory, read only memory, random access memory, solid state drives, and any other physical storage mediums) can be used to encode the instructions that, when executed by one or more processors, cause the techniques provided herein to be carried out. These and other advantages and alternative embodiments will be apparent in light of this disclosure.

In some embodiments, further refining of the output of the ML model (e.g., classification and location of structural elements on a page) can be performed using post-processing error correction techniques. For example, a post-processing error correction operation can be provided to augment the ML model and use adjacent document content to correctly classify misclassified structural elements or to classify structural elements that were not classified by the ML model. The adjacent document content can vary from one embodiment to the next. In some such embodiments, document content adjacent to a particular structural element that is being classified includes other structural elements and/or graphics in close proximity to that particular structural element (e.g., directly above, directly below, or on either side of). Accordingly, techniques associated with rasterizing different input channels of content for a given page of the document and techniques associated with post-processing error correction of the ML model output can be combined to provide more reliable and accurate identification of classification and location for one or more structural elements on the page of the electronic document.

System Architecture

FIG. 1 shows an example system 100 for identifying and classifying structural elements in an electronic document, in accordance with an embodiment of the present disclosure. The system 100 includes a computing device 102 having a processor 108, a storage 110, one or more non-transitory storage media 112, a network interface 114, and a Document Structure Detection Application 118. System 100 may also have a graphical user interface (GUI) 116 that may include a display and a user input device. In some embodiments, GUI 116 represents a command-line interface.

According to some embodiments, processor 108 of the computing device 102 is configured to execute the following modules of Document Structure Detection Application 118, each of which is described in further detail below: Model Training Module 120, Image Capture Module 122, Rasterization Module 124, Structure Detection Module 126 and Correction Module 128. Computing device 102 is further configured to receive, as inputs, at least one document image 104 or other object, and a ML model 106. According to some embodiments, ML model 106 provides, to the computing device 102, object models representing shapes, styles, or other formatting associated with particular classifications of document structural elements, learned using machine learning techniques. Each document image 104 represents an electronic document (or a particular page of an electronic document) to be processed by computing device 102. In some embodiments, computing device 102 is further configured to produce an output image of the document (or page of the document) that is based at least in part on the input document image 104 and the identified structural elements of the document image 104. The output image can, for example, include a digital image of the document (or page) appearing in the input document image 104 with one or more of the structural elements in the document marked, labeled, indicated, or identified in a human readable or machine-readable manner, such as variously described in this disclosure. Any number of standard or proprietary digital images (e.g., JPEG, bitmap, PNG, TIFF, QuickTime VR, and PANO) can be used for the input document image 104. Each of the modules 120, 122, 124, 126, and 128 can be used in conjunction with each other in any order for identifying and classifying the structural elements of the input document image 104.

Computing device 102 can be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), VR device or VR component (e.g., headset, hand glove, camera, treadmill, etc.) or other form of computing or telecommunications device that is capable of communication and that has sufficient processor power and memory capacity to perform the operations described in this disclosure. A distributed computational system can be provided including a plurality of such computing devices.

In some embodiments, some of the modules are executed in one computing device while other modules are executed in another computing device. For example, Model Training Module 120 along with machine learning model 106 may be used and executed by a first computing device while Image Capture Module 122, Rasterization Module 124, Structure Detection Module 126 and Correction Module 128 are executed by a second computing device. In some embodiments, the second computing device can access or receive machine learning model 106 from the first computing device. By using separate computing devices, a more powerful computing device (or multiple computing devices) may be used for training the ML model 106, while less powerful devices (such as smartphones or tablet computers) can be used for applying the trained ML model to detect document structural elements.

Computing device 102 includes one or more storage devices 110 or non-transitory computer-readable media 112 having encoded thereon one or more computer-executable instructions or software for implementing techniques as variously described in this disclosure. The storage devices 110 can include a computer system memory or random access memory, such as a durable disk storage (which can include any suitable optical or magnetic durable storage device, e.g., RAM, ROM, Flash, USB drive, or other semiconductor-based storage medium), a hard-drive, CD-ROM, or other computer readable media, for storing data and computer-readable instructions or software that implement various embodiments as taught in this disclosure. The storage device 110 can include other types of memory as well, or combinations thereof. The storage device 110 can be provided on the computing device 102 or provided separately or remotely from the computing device 102. The non-transitory computer-readable media 112 can include, but are not limited to, one or more types of hardware memory, non-transitory tangible media (for example, one or more magnetic storage disks, one or more optical disks, one or more USB flash drives), and the like. The non-transitory computer-readable media 112 included in the computing device 102 can store computer-readable and computer-executable instructions or software for implementing various embodiments. The computer-readable media 112 can be provided on the computing device 102 or provided separately or remotely from the computing device 102.

The computing device 102 also includes at least one processor 108 for executing computer-readable and computer-executable instructions or software stored in the storage device 110 or non-transitory computer-readable media 112 and other programs for controlling system hardware. Virtualization can be employed in the computing device 102 so that infrastructure and resources in the computing device 102 can be shared dynamically. For example, a virtual machine can be provided to handle a process running on multiple processors so that the process appears to be using only one computing resource rather than multiple computing resources. Multiple virtual machines can also be used with one processor. Network interface (I/F) 114 can be any appropriate network chip or chipset which allows for wired or wireless connection between the computing device 102 and a communication network (not shown) and other computing devices and resources.

A user can interact with the computing device 102 through an output device 130, such as a screen or monitor, which can display one or more user interfaces or images, including input document image 104 and/or the output image, as provided in accordance with some embodiments. As noted above, in some embodiments, output device 130 displays the various structural elements of input document image 104 using a different display scheme determined based on the identified locations and classifications of the various structural elements. The output device 130 can also display other aspects, elements, information or data associated with input document 104 or the Document Structure Detection Application 118. The computing device 102 can include input or input/output devices 132 for receiving input from a user, for example, a keyboard, a joystick, a game controller, a pointing device (e.g., a mouse, a user's finger interfacing directly with a touch-sensitive display device, etc.), or any suitable user interface, including an AR headset. The computing device 102 can further include a digital imager 134 configured to acquire an input document image 104. The digital imager 134 can be a digital camera, digital document scanner, or other device configured to acquire the input document image 104. The computing device 102 may include any other suitable conventional I/O peripherals. In some embodiments, computing device 102 includes or is operatively coupled to various suitable devices for performing one or more of the aspects as variously described in this disclosure.

The computing device 102 can run any operating system, such as any of the versions of Microsoft® Windows® operating systems, the different releases of the Unix® and Linux® operating systems, any version of the MacOS® for Macintosh computers, any embedded operating system, any real-time operating system, any open source operating system, any proprietary operating system, any operating systems for mobile computing devices, or any other operating system capable of running on the computing device 102 and performing the operations described in this disclosure. In an embodiment, the operating system can be run on one or more cloud machine instances.

In other embodiments, the functional components/modules can be implemented with hardware, such as gate level logic (e.g., FPGA) or a purpose-built semiconductor (e.g., ASIC). Still other embodiments can be implemented with a microcontroller having several input/output ports for receiving and outputting data, and several embedded routines for carrying out the functionality described in this disclosure. In a more general sense, any suitable combination of hardware, software, and firmware can be used, as will be apparent.

As will be appreciated in light of this disclosure, the various modules and components of the system, such as any of the modules 120, 122, 124, 126, 128, the GUI 116, or any combination of these, may be implemented in software, such as a set of instructions (e.g., HTML, XML, C, C++, object-oriented C, JavaScript®, Java®, BASIC, etc.) encoded on any computer readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors or databases in different configurations and arrangements, and that the depicted embodiments are not intended to be limiting. Various components of this example embodiment, including the computing device 102, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating systems, are not shown but will be apparent.

ML model 106 can be pre-determined; however, in some embodiments machine learning techniques can be used to further train ML model 106 using various types of synthetic and real-world data. According to some embodiments, Model Training Module 120 is configured to train the ML model 106 to identify and classify various document structural elements using a received set of input documents. For example, Model Training Module 120 may be designed to feed the ML model 106 millions or more of electronic documents to train ML model 106 to identify particular structures. ML model 106 may then be used to determine the probability that a given structural element on a given input document image 104 belongs to a certain classification. ML model 106 may also be used to determine the instance bounds (e.g., location) of the given structural element. The probability can then be used to select classifications for each identified structural element. In some embodiments, Model Training Module 120 learns various model parameters from the training documents to be used by ML model 106, such as parameters associated with font style, font location on the page, font size, graphical symbols, arrangement of line graphics, alignment of text, structural grouping of context within tables, etc. The model parameters can then be applied to the various structural elements on the input document image to determine classification probabilities and instance bounds for each of the structural elements.

In accordance with an embodiment of the present disclosure, ML model 106 of FIG. 1 includes a convolutional neural network (CNN) trained on the task of object detection. The neural network may be trained by Model Training Module 120 to assist with identifying structural elements within an electronic document. The training data can include any number of document pages that have been manually annotated by proving the instance bounds and classification of each structural element on the page. During the training process, the ML model learns the object detection task of predicting all the instances on the page. In some embodiments, the architecture of ML model 106 involves a series of convolutional and pooling layers ending with feed-forward layers for the eventual classification and bounding-box regression task for the structural elements on a given page. The model may be a single-shot detector, which is a proposal-less CNN architecture where the model makes a single forward pass over the entire input image and treats detection as a regression problem by predicting (a) the set of instance bounds as regression offsets from suitable anchors, (b) probabilities of how relevant/strong that prediction is (objectness), and (c) probabilities for classifications. The anchors refer to center points of the structural elements, since document structures such as body text, list items, or tables have no standard aspect ratio. In some embodiments, the CNN contains, for example, 30 convolutional layers, 5 pooling layers, 5 batch-normalization layers, and final sigmoid and softmax layers to predict location and classification of the document structural elements.

According to some embodiments, Image Capture Module 122 is configured to capture the input document image 104 using digital imager 134. For example, a user may take a photograph of, or scan, a paper document using digital imager 134. It should be understood that Image Capture Module 122 provides one example method for procuring input document image 104, and that input document image 104 may also be received via network 114, loaded from storage 110, or loaded from storage in an external device.

According to some embodiments, Rasterization Module 124 is configured to rasterize each page of input document 104 to be fed as an input to ML model 106 (or stored in storage 110 before being fed as input to ML model 106). Furthermore, Rasterization Module 124 decomposes each page of input document image 104 into various channels of specific-type rasterized content that can each be fed into ML model 106. Examples of content channels include text-only rasterized content, graphics-only rasterized content, or image-only rasterized content found on a given page of input document image 104, as will be described in more detail herein. In some embodiments, Rasterization Module 124 is configured to rasterize additional pages before and/or after a given page of input document image 104. In such cases, the additional pages may also be fed as inputs to ML model 106 to compare with the given page to help identify certain repeating structures between the sequential pages (e.g., headers and footers). Further details of the operations performed by Rasterization Module 124 are provided in reference to FIG. 2.

According to some embodiments, Structure Detection Module 126 uses the ML model 106 to determine location and/or classification for each of one or more document structural elements on input document image 104. Structure Detection Module 126 may generate a structural map for each page of a document that identifies the classification and/or location of the various structural elements. Further details of the operations performed by Structure Detection Module 126 are provided in reference to FIG. 3.

According to some embodiments, Correction Module 128 uses post-processing techniques to correct errors in the classification and/or location of certain ones of the document structural elements. These errors may occur due to inconsistent or inaccurate analysis performed by the ML model 106. The post-processing techniques involve using document content adjacent to the erroneously classified structural element to correct the error. Further details of the operations performed by Correction Module 128 are provided in reference to FIG. 4.

Figure 2:
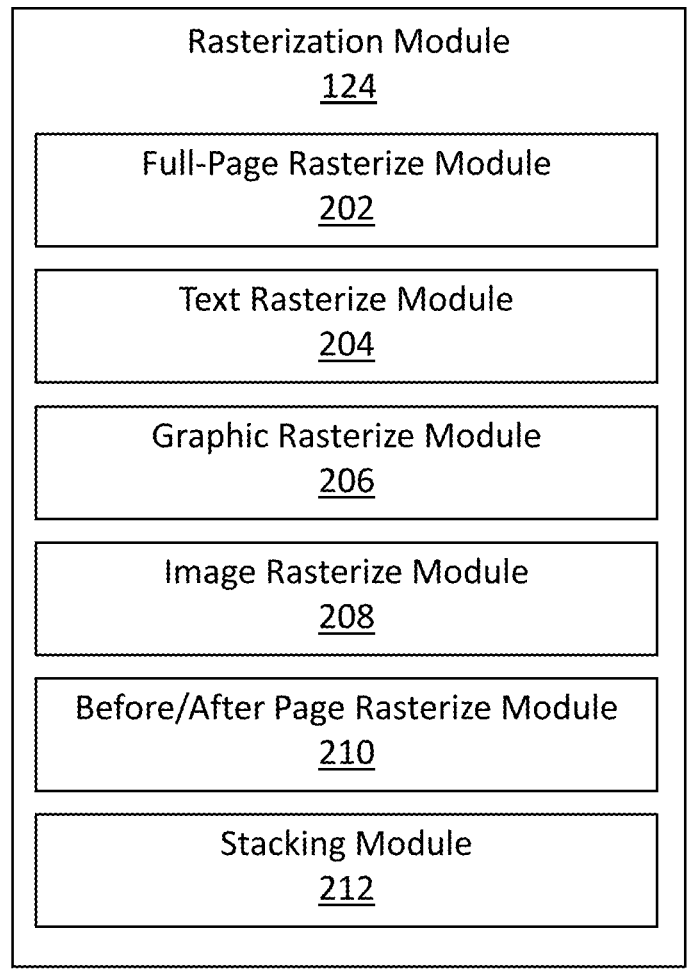
FIG. 2 is a functional diagram of an example multi-channel rasterization module that rasterizes a full target page of a given document as well as specific content types from the target page, and full pages before and after the target page, in accordance with some embodiments of the present disclosure.

FIG. 2 is a functional diagram of the Rasterization Module 124 in further detail, in accordance with an embodiment of the present disclosure. Rasterization Module 124 includes a Full-page Rasterize Module 202, a Text Rasterize Module 204, a Graphic Rasterize Module 206, an Image Rasterize Module 208, a Before/After Page Rasterize Module 210, and a Stacking Module 212. According to some embodiments, Rasterization module 124 and each of its associated sub-modules operate on a page-by-page basis.

Full-page Rasterize Module 202 rasterizes an entire target page, which includes any structural elements on that page, and may provide the rasterized target page as a first channel to ML model 106. The rasterized page is used by ML model 106 to identify and classify structural elements present on the page. ML model 106 can use either a pixel-based detection scheme or an object-based detection scheme with the rasterized page to detect the structural elements present on the page. The rasterized page may include regions where certain structural elements partially or fully overlap.

Text Rasterize Module 204 decomposes the page into its text-based structural elements by using information native to the electronic document to separate all of the text on the page from other non-text structures and rasterizes only the text-based structural elements, in accordance with an embodiment of the present disclosure. The native document information may be found, for example, in the page description language, which, in the case of a PDF, includes a set of drawing commands for the page contents. The channel of rasterized text structures is input into ML model 106. Any text structures on the page may be rasterized and included in the text channel, including structures found in the header and footer of the page. Additionally, the text-based structures may be further decomposed into various other channels based on the type of text. For example, text structures can be separated into different channels based on their size (e.g., all text less than font size 12 into a first channel, all text with font size greater than 12 but less than 16 into a second channel, and all text with font size greater than 16 into a third channel.) Text with higher font size may be more likely to be classified as "heading" while text with smaller font size may be more likely to be classified as "footnote." In other examples, text structures can be separated into different channels based on their style, color, location on the page, orientation, etc.

Graphic Rasterize Module 206 decomposes the page into its graphic-based structural elements by using information native to the electronic document to separate all of the graphics on the page from other non-graphic structures and rasterizes only the graphic-based structural elements, in accordance with an embodiment of the present disclosure. The native document information may be found, for example, in the page description language, which, in the case of a PDF, includes a set of drawing commands for the page contents. The channel of rasterized graphic structures is input into ML model 106. Any graphic structures on the page may be rasterized and included in the graphic channel, including graphics found in the header and footer of the page. Additionally, the graphic-based structures may be further decomposed into various other channels based on the type of graphic. For example, graphic structures made up of only line graphics can be separated into a first channel while other graphics made up of symbols or smaller icon-type graphics can be separated into a second channel.

Image Rasterize Module 208 decomposes the page into its image-based structural elements by using information native to the electronic document to separate all of the images on the page from other non-image structures and rasterizes only the image-based structural elements, in accordance with an embodiment of the present disclosure. The native document information may be found, for example, in the page description language, which, in the case of a PDF, includes a set of drawing commands for the page contents. The channel of rasterized image structures is input into ML model 106. Any image structures on the page may be rasterized and included in the image channel, including images found in the header and footer of the page.

Before/After Page Rasterization Module 210 rasterizes additional pages around a given page and provides these additional pages as input channels to ML model 106, in accordance with some embodiments of the present disclosure. The rasterized pages may include any number of pages sequentially before and/or after any particular page. For example, if page 7 of input document image 104 is being rasterized for detection of structural elements on the page, then Before/After Page Rasterization Module 210 may be used to additionally rasterize pages 6 and 8 (one page before and one page after page 7) and provide these additional pages as different input channels to ML model 106.

Stacking Module 212 lines up each of the channels of rasterized content generated from one or more of Modules 202-210 and stacks the channels on top of one another, in accordance with some embodiments of the present disclosure. One or more of the stacked channels of rasterized content may be scaled such that the entire stack fits within a same 2D resolution. For example, the stacked channels may be scaled to fit within a matrix of size 512×512×6, with the '6' representing six rasterized channels (herein referred to as layers) output from one or more of Modules 202-210. Other matrix sizes are possible depending on the desired resolution of the stack. According to some embodiments, the various layers of the stack may be input into ML model 106 and allow for convolutional kernels to directly extract the document structural elements in whichever layer the particular structural elements are present. Another benefit from the stack of channels is that certain structural elements, such as headers and footers, can be identified based on their repeated locations across multiple pages.

Figure 3:
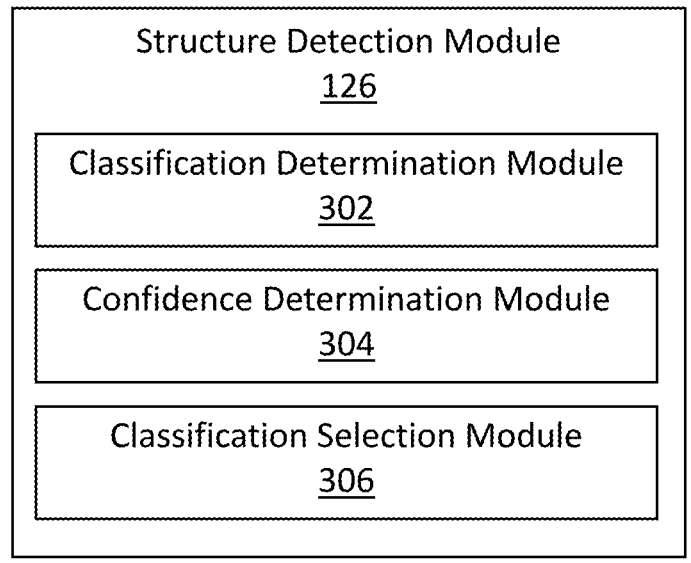
FIG. 3 is a functional diagram of an example document structure detection module that employs multi-channel machine learning to detect and classify structural elements of a document, in accordance with an embodiment of the present disclosure.

FIG. 3 is a functional diagram of the Structure Detection Module 126 in further detail, in accordance with an embodiment of the present disclosure. The Structure Detection Module 126 includes a Classification Determination Module 302, a Confidence Determination Module 304, and a Classification Selection Module 306. According to some embodiments, Structure Detection Module 126 operates to identify structural elements on a page-by-page basis using ML model 106. In other words, structural elements that span across pages will not be identified as a single structural element, but rather as separate structural elements for each page. According to some embodiments, Structure Detection Module 126 identifies structural elements on a given page using the various channels of rasterized content provided by Rasterization Module 124.

The Classification Determination Module 302 determines one or more possible classifications for each structural element on each page of an electronic document, in accordance with some embodiments. For example, a segment of text in the document could be identified as being a heading, body text, or a footnote. The possible classifications are determined using the ML model 106 based on similarities between the structural element and previously identified structural elements having certain known classifications during training of the ML model 106. In some examples, only one classification is determined for a given structural element, representing full confidence from the ML model 106 that the determined classification is correct. Any number of classifications may be identified as possible correct classifications for any number of structural elements in the electronic document.

The Confidence Determination Module 304 determines a confidence metric for each of the determined possible classifications from Classification Determination Module 302 for a given structural element, in accordance with some embodiments. The confidence metric may represent a probability (given out of 1.0) that an identified possible classification is the correct classification for the given structural element. The probabilities are determined by the ML model. Following the example provided above, a segment of text identified as being either a heading, body text, or a footnote may have confidence metrics of 0.7 (or 70%), 0.2 (or 20%), and 0.1 (or 10%) respectively assigned to the possible classifications. In some embodiments, the assigned confidence metrics for each possible classification do not add up to 1.0 (or 100%). In some embodiments, only one classification may be determined for a given structural element, in which case the one classification is assigned a confidence metric of 1.0 (or 100%) or is not assigned a confidence metric. In some embodiments, the confidence metric may be increased for certain possible classifications based on the additional rasterized channels of content (or additional adjacent rasterized pages). For example, text that is identified as possibly being body text, but is obscured by a graphic thus lowering the confidence, could have its confidence metric increased by identifying the text in the rasterized text-only channel (where the graphic is not present).

The Classification Selection Module 306 selects one of the possible classifications to assign to a given structural element based on the determined confidence metrics from Confidence Determination Module 304, in accordance with some embodiments. Following the example provided above, for a segment of text having confidence metrics of 0.7 (or 70%) for heading, 0.2 (or 20%) for body text, and 0.1 (or 10%) for footnote, Classification Selection Module 306 would select heading as the classification to assign to the given segment of text based on it having the highest confidence metric. In some embodiments, only one classification may be determined for a given structural element, in which case Classification Selection Module 306 is not used or merely selects the only possible provided classification.

Figure 4:
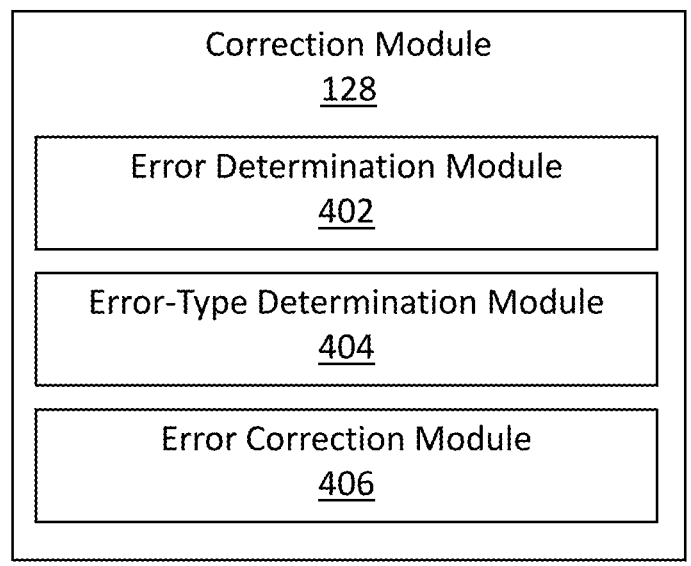
FIG. 4 is a functional diagram of an example correction module for correcting structural elements of a document that have been misclassified by the document detection module of FIG. 3, in accordance with an embodiment of the present disclosure.

FIG. 4 is a functional diagram of the Correction Module 128 in further detail, in accordance with an embodiment of the present disclosure. The Correction Module 128 includes an Error Determination Module 402, an Error-Type Determination Module 404, and an Error Correction Module 406. According to some embodiments, Correction Module 128 operates to correct misclassified structural elements on a page-by-page basis, as discussed above.

The Error Determination Module 402 considers each of the structural elements on a given page of the electronic document and determines if a possible error exists in either or both the classification and location of the structural element, in accordance with some embodiments. A possible error may exist if the confidence metric for a selected classification for the given structural element is below a threshold value. For example, if a threshold confidence metric is at 70%, a structural element provided the "heading" classification, but with only a confidence metric of 55% (while the "body text" classification had a confidence metric of 45%), would be identified by Error Determination Module 302 as potentially having an erroneous classification since the 55% confidence metric is below the threshold value. Other threshold values for determining potentially erroneous classification include 95%, 90%, 85%, 80%, or 75%. Another example for determining a potentially erroneous classification includes situations when at least two or at least three possible classifications are determined for a given structural element.

In some embodiments, Error Determination Module 402 determines a potentially erroneous situation with regards to the instance bounds of a given structural element. The instance bounds identify the extent (e.g., area or location on the page) for a given structural element. In some cases, the instance bounds of the given structural element may be determined to be too small (not including the full structural element) or too large (including other adjacent structural elements).

The Error-Type Determination Module 404 determines what type of error has occurred (if an error has occurred) for a given structural element, in accordance with some embodiments. In some embodiments, more than one type of error can apply to a given structural element. Error types generally fall into one of three classifications—classification errors, instance boundary errors, and data loss errors. Classification errors, as the name suggests, result from misclassifying a particular structural element. Instance boundary errors result from incorrect instance bounds of a given structural element. Data loss errors occur when structural elements have not been classified. In some embodiments, document content surrounding the structural element with the identified error can be used by Error-Type Determination Module 404 to help determine what kind of error has occurred. For example, patterns of particular classifications found in adjacent text on the page can be observed to determine that a given structural element having a different classification likely has a classification error.

The Error Correction Module 406 uses adjacent document content on the page of the electronic document to correct any of the errors associated with a given structural element, in accordance with some embodiments. The adjacent document content can include other structural elements or page graphics. In some embodiments, the classification or location of the adjacent structural elements can be used to determine how to correct the one or more errors associated with the given structural element.

In some embodiments, Error Correction Module 406 utilizes intrinsic document content (herein also referred to as rich information) associated with the electronic document to determine various characteristics of the identified structural elements. Electronic documents (PDFs, word processing documents, etc.) have page content representations that contain the aforementioned rich information associated with text characters/glyphs, graphics (vectors, lines, rectangles), and other images on the page. The rich information can include details about a given structural element such as, for example, its bounding box, general type (text, graphic, vector, etc.), font properties (for text structures), and location or size of the elements on the page. For example, the rich information associated with the document may be used to identify that certain text structures are bolded, underlined, and/or italicized. The rich information may be used to identify spatial relationships (e.g., alignment or distance) between the identified structural elements. For example, bounding boxes around adjacent structural elements may share a same or aligned edge. In another example, structural elements may be considered adjacent if their bounding box edges are within a threshold spacing from one another. Furthermore, gap distances between structural elements can be determined based on distance (e.g., number of pixels) between edges of the bounding boxes associated with the structural elements. Even scanned documents typically have a hidden text layer that can be used to provide rich information regarding the text type and associated bounding boxes. Accordingly, Error Correction Module 406 may use both the output from the ML model (e.g., possible classifications with corresponding confidence scores) and the rich information associated with the electronic document to perform the post-processing error correction of the determined classification and/or location of the structural elements. Particular examples of correcting various types of errors using the output from the ML model and the rich information associated with the document are explained in more detail herein with reference to FIGS. 9-16.

Although discussion of the various sub-modules of Correction Module 128 have been with regards to a single given structural element, it should be understood that the operations of Correction Module 128 can be applied across any or all structural elements on each page of an electronic document. Furthermore, as discussed above, Correction Module 128 may be configured to operate on a page-by-page basis—identifying and correcting errors found on each separate page.

Figure 5:
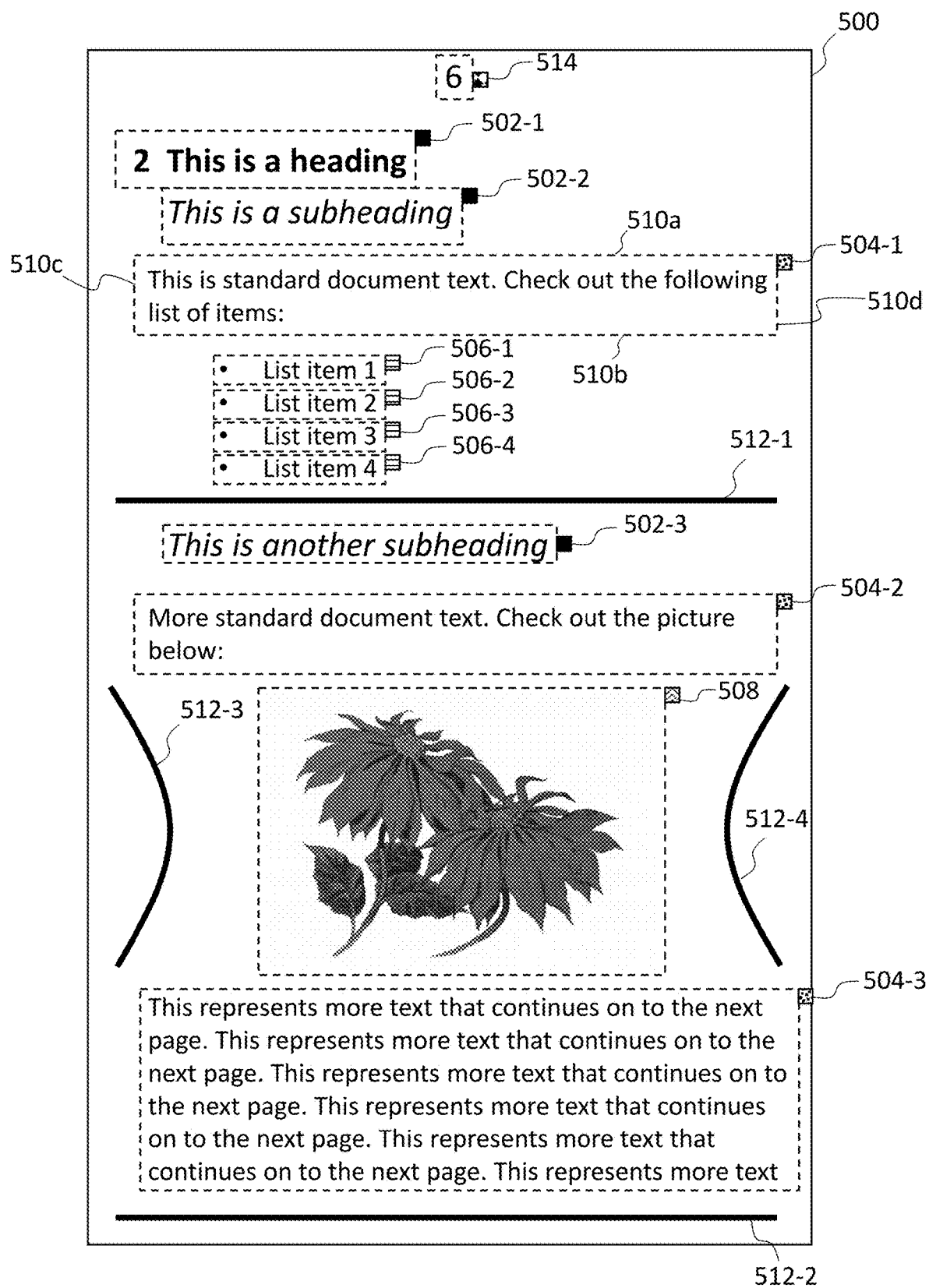
FIG. 5 shows an example electronic document page having various identified structural elements, in accordance with an embodiment of the present disclosure.

FIG. 5 illustrates an example page 500 of an electronic document having various identified structural elements, according to an embodiment. Page 500 may be any page of an image file such as a PDF file or any other type of digital image (e.g., JPEG, bitmap, PNG, TIFF, QuickTime VR, and PANO). Structure Detection Module 126 may be used to identify the presence of the various structures on page 500. For the ease of illustration, the identified structural elements in FIG. 5 (with the exception of the graphic elements) have been provided with a dashed box.

As noted above, different classifications of structural elements can exist on any given page. For example, heading classifications 502-1 to 502-3 may be identified based on particular characteristics, such as the font style/size or placement on page 500, to name a few examples. In another example, body text classifications 504-1 to 504-3 may be identified based on particular characteristics, such as the density of the text or font style/size, to name a few examples. In another example, list item classifications 506-1 to 506-4 may be identified based on particular characteristics, such as the organized nature of the text, bullet point graphics, or font style/size, to name a few examples. In another example, a figure classification 508 may be identified based on particular characteristics, such as the use of non-text graphics or color, to name a few examples. In another example, any number of graphic classifications 512-1 to 512-4 may be present on page 500. Some line graphics, such as graphic classifications 512-1 and 512-2, may be used to visually separate portions of page 500. Other line graphics, such as graphic classifications 512-3 and 512-4, may be provided to add flair to page 500. Additionally, a header structure may be provided a header classification 514. In this example, a page number found in the page header is given the header classification. In some other embodiments, the header structure is provided either a heading classification or a body text classification. Each of the various identified structural elements may have their associated classification assigned by Structure Detection Module 126 using ML model 106.

As noted above, each identified structural element includes associated instance bounds, such as instance bounds 510a-510d used to identify the location of the text block structure having the body text classification 504-1. Instance bound 510a ensures that the body text classification 504-1 does not include the text of heading classification 502-2. Similarly, instance bound 510b ensures that the body text classification 504-1 does not include the text of list item classification 506-1. Instance bounds 510c and 510d define the text width across page 500. Identifying particular structural elements using instance bounds is an object-detection scheme as opposed to a pixel-detection (or image segmentation) scheme, which uses patterns of the pixel graphics to determine the existence of different document structures.

Figure 6B:
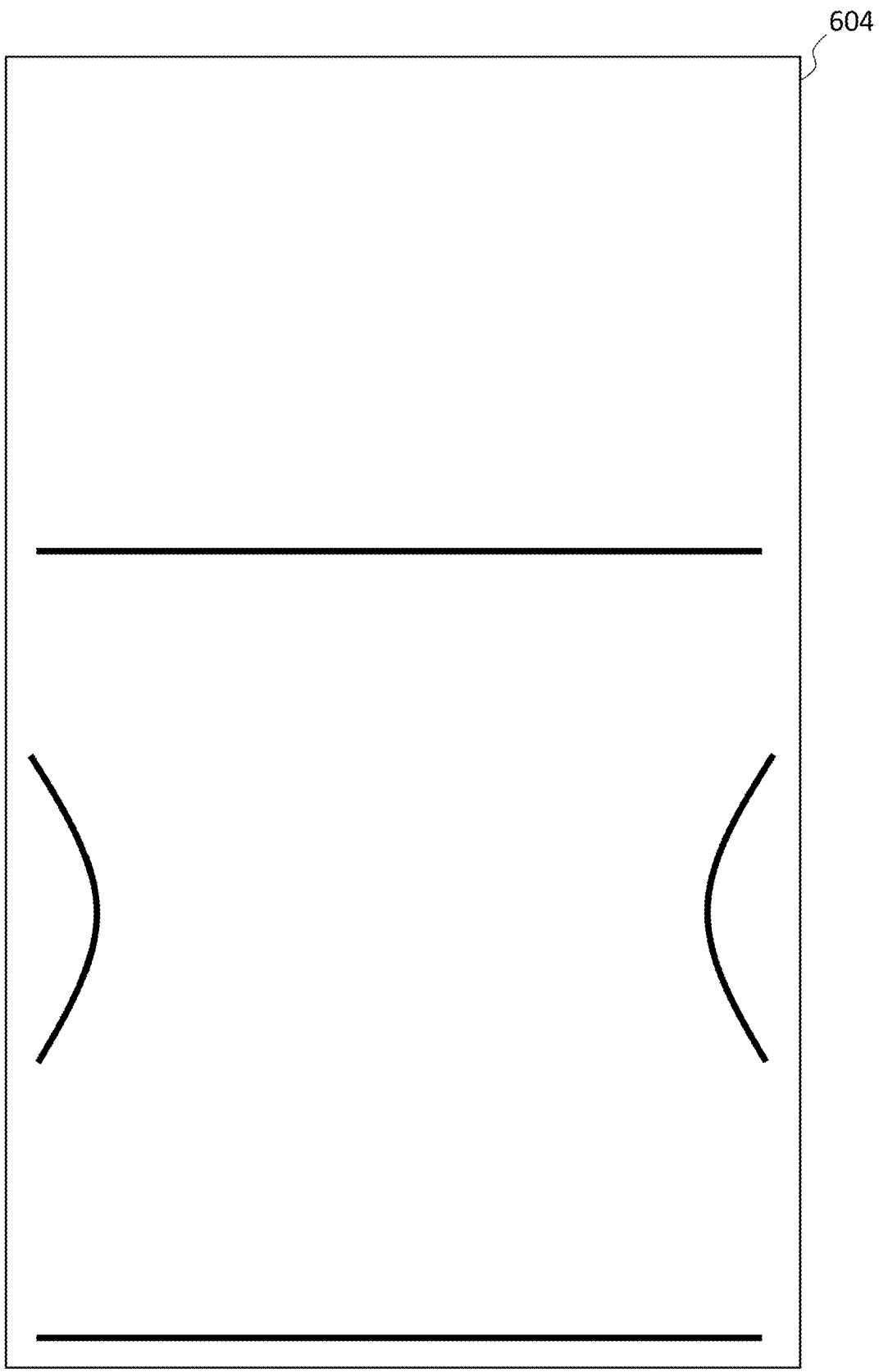
FIG. 6B shows an example channel of rasterized graphic structures from the electronic document page of FIG. 5, in accordance with an embodiment of the present disclosure.
Figure 6C:
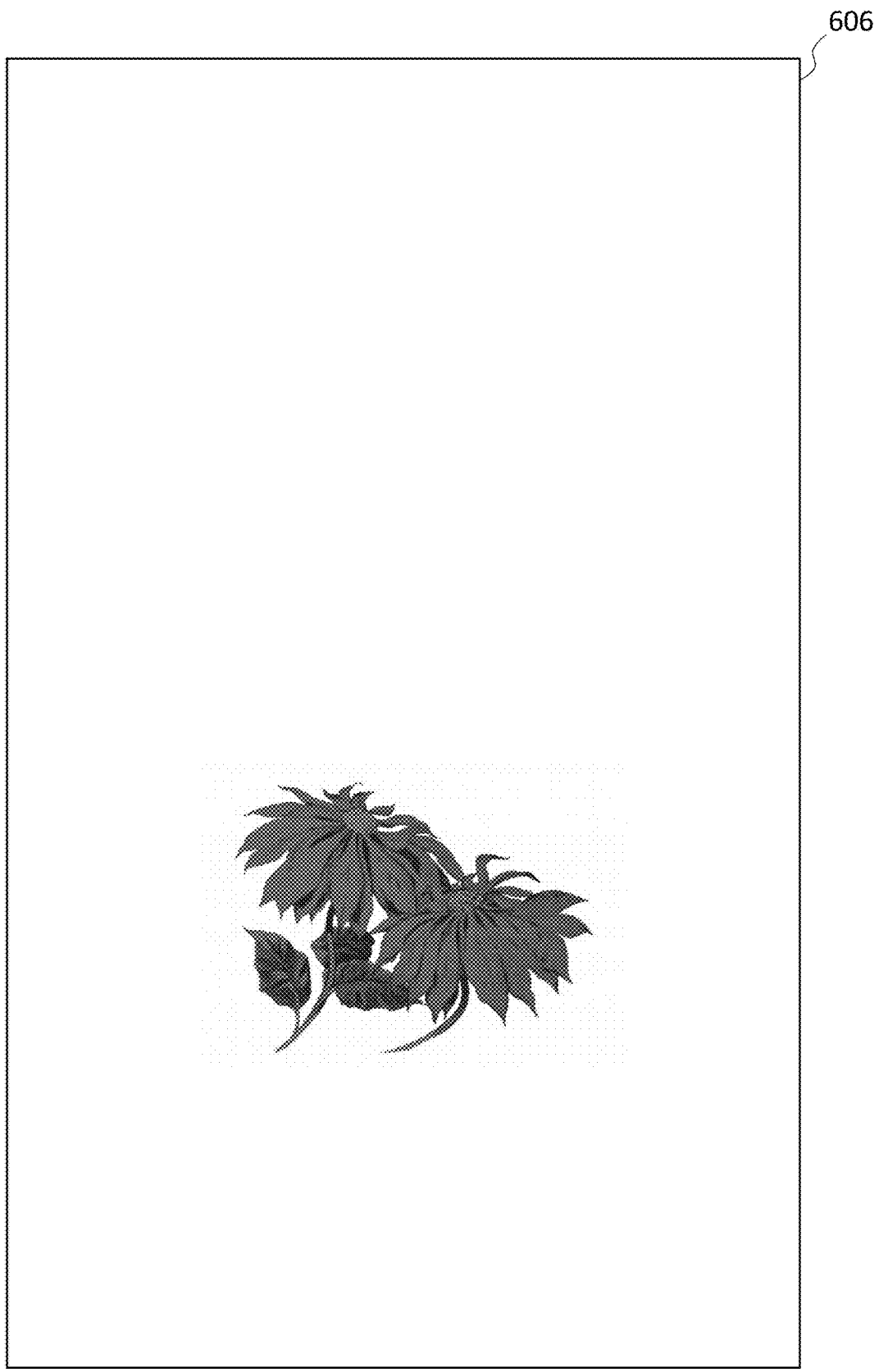
FIG. 6C shows an example channel of rasterized image structures from the electronic document page of FIG. 5, in accordance with an embodiment of the present disclosure.

As discussed above, Rasterization Module 124 would rasterize the full-page 500 as one input channel for ML model 106, and also rasterize additional input channels of different content each. FIGS. 6A-6C illustrate additional example rasterized input channels based on page 500, according to some embodiments.

FIG. 6A illustrates an input channel 602 that includes only rasterized text structural elements based on decomposition of the structural elements on page 500, according to an embodiment. The text structural elements include all of the headings, body text, list item text, etc. that were present on page 500. These text structural elements also may include any header or footer text as illustrated in this example. The ability to correctly classify the header and footer text may be enhanced by observing the presence of the header or footer across multiple pages (e.g., in the same location on each page) as will be discussed in more detail with reference to FIG. 7. Note that these text structural elements are not illustrated as being classified yet because input channel 602 represents one input to ML model 106 before classification of the structural elements has been performed.

FIG. 6B illustrates an input channel 604 that includes only rasterized graphic structural elements based on decomposition of the structural elements on page 500, according to an embodiment. The graphic structural elements include all of the line graphics that were present on page 500. Note that these graphic structural elements are not illustrated as being classified yet because input channel 604 represents one input to ML model 106 before classification of the structural elements has been performed.

FIG. 6C illustrates an input channel 606 that includes only rasterized image structural elements based on decomposition of the structural elements on page 500, according to an embodiment. In this example, the image structural elements only include the one figure that was present on page 500 (although only one figure is used here, any number of image structural elements could be present on the page). Note that this image structural element is not illustrated as being classified yet because input channel 606 represents one input to ML model 106 before classification of the structural elements has been performed. It should also be noted that not all figures are necessarily image structural elements, as they may be formed using vector graphics or other such graphics that would make the figures graphical structural elements instead.

Figure 7A:
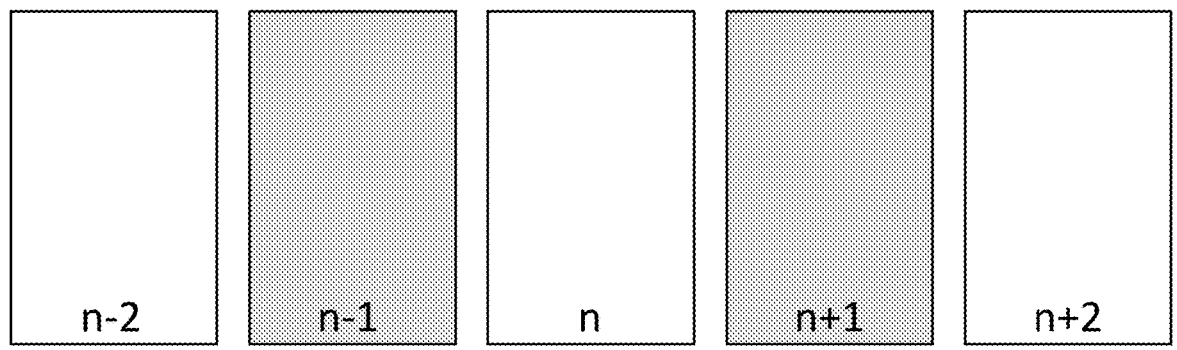
FIG. 7A shows an example of rasterizing one page before and one page after the electronic document page of FIG. 5, in accordance with an embodiment of the present disclosure.

FIG. 7A illustrates an example operation performed by Before/After Page Rasterize Module 210, according to an embodiment. Page n of an electronic document is being rasterized via Full-Page Rasterize Module 202. In this example, adjacent pages n+1 and n−1 are also rasterized and included as input to ML model 106 along with the full-page rasterized image of page n. In some embodiments, pages n+1 and n−1 are combined together as a single input channel to send to ML model 106. In some embodiments, page n+1 is provided as a separate input channel from page n−1 to ML model 106.

Figure 7B:
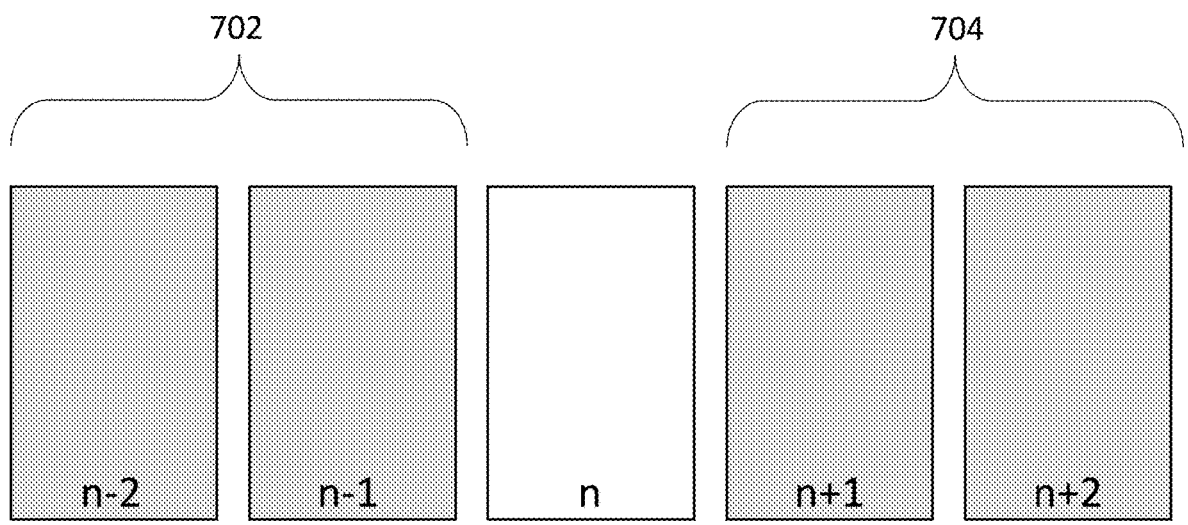
FIG. 7B shows an example of rasterizing a group of pages before and a group of pages after the electronic document page of FIG. 5, in accordance with an embodiment of the present disclosure.

FIG. 7B illustrates another example operation performed by Before/After Page Rasterize Module 210, according to an embodiment. Page n of an electronic document is being rasterized via Full-Page Rasterize Module 202. In this example, more than one page on either side of page n are rasterized and included as inputs to ML model 106. Both pages n−1 and n−2 are rasterized and combined to form combined before-pages 702, which is included as an input channel to ML model 106. Similarly, both pages n+1 and n+2 are rasterized and combined to form combined after-pages 704, which is included as a separate input channel to ML model 106. In some embodiments, all of pages n−1, n−2, n+1, and n+2 are combined together as a single input channel to ML model 106.

Inputting additional pages before and/or after a given page enhances the ability for ML model 106 to detect pagination artifacts, according to some embodiments. For example, the pattern of same headers and footers on the multiple pages can be identified by ML model 106 and used to strengthen the confidence that the repeated text is of a particular structure classification. Recognizing the pattern across the multiple pages may involve recognizing a same style, position, or written text of certain structures across the pages. In some embodiments, ML model 106 determines a unique classification type (e.g., an artifact classification) to the repeated structural elements across the pages. In some embodiments, ML model 106 factors in the repeated pattern of a particular structure when determining confidence scores for possible classifications of the particular structure.

It should be understood that the above examples illustrated in FIGS. 7A and 7B are not limiting and that any number of additional pages before and/or after page n can be rasterized and included as input to ML model 106. In situations where there are no pages before or after page n (e.g., if page n is near the beginning or end of a document), blank pages may be used in place of the missing pages.

Figure 8:
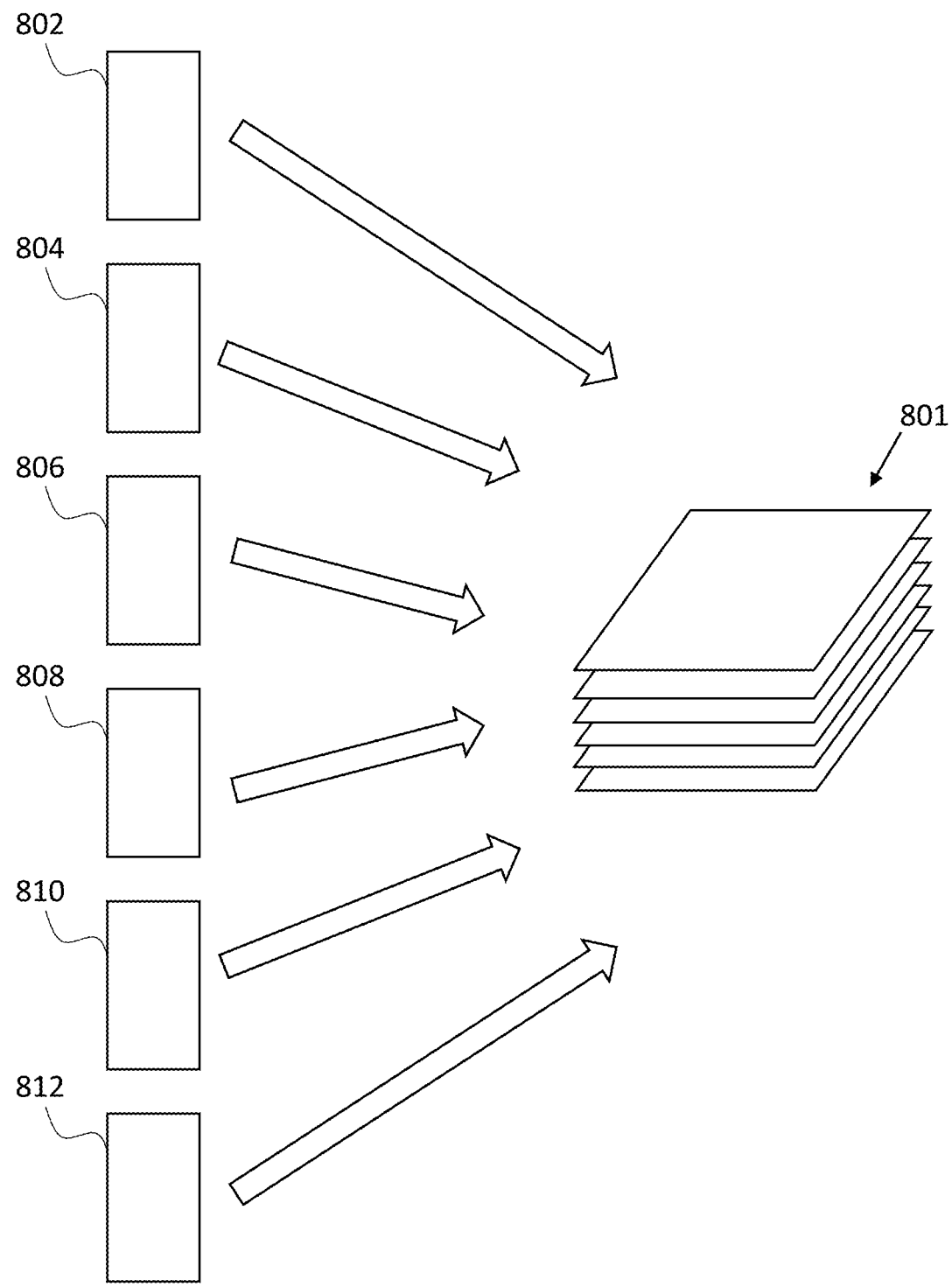
FIG. 8 illustrates a stacking operation that stacks multiple channels of rasterized content of a document, the resulting stack for delivery to a multi-channel machine learning model, in accordance with an embodiment of the present disclosure.

FIG. 8 illustrates an example operation performed by Stacking Module 212, according to an embodiment. The various input channels of rasterized content associated with a given page(s) of an electronic document are collected and stacked into a single matrix 801 for delivery to ML model 106. A first input channel 802 may include a rasterized image of the given page. A second input channel 804 may include a rasterized image of only the text structures on the given page. A third input channel 806 may include a rasterized image of only the graphic structures on the given page. A fourth input channel 808 may include a rasterized image of only the image structures on the given page. A fifth input channel 810 may include a rasterized image of one or more combined pages sequentially after the given page. A sixth input channel 812 may include a rasterized image of one or more combined pages sequentially before the given page. More or less input channels than the six illustrated here can be used in matrix 801.

In some embodiments, each of the rasterized input channels 802-812 are greyscale channels, with each pixel given a greyscale value from 0 to 1 (with 0 being black, 1 being white, and grey values in-between). In some other embodiments, color channels can be used as well with each color given its own rasterized channel. In some such examples, any of rasterized input channels 802-812 can be broken down into additional rasterized channels for each color. In an example where red, green, and blue channels are desired, any of the six input channels could have three color channels (red, green, blue) yielding anywhere from 8 total channels (if one input channel is split into three color channels) to 18 total channels (if each input channel is split into three color channels) within matrix 801.

Stacking Module 212 takes each of input channels 802-812 and resizes them to the same 2D resolution before stacking them over one another in matrix 801, according to an embodiment. Re-sizing may be performed because the input channels 802-812 may not each have a rasterized image with the same size. For example, the additional rasterized pages from fifth input channel 810 or sixth input channel 812 may include pages having a different orientation (e.g., landscape vs portrait) compared to the given page from input channel 802. Matrix 801 can have any 2D resolution, for example, 256×256 pixels, 512×512 pixels, or 1024×1024 pixels. In some embodiments, matrix 801 is a 3D tensor of size height×width×number of channels (e.g., 512 pixels×512 pixels×6 channels).

Stacking each of inputs 802-812 before inputting to ML model 106 has many advantages. For example, it is easier for ML model 106 to identify which of the input channels have similar structures in the same locations. This is especially useful to identify headers and footers that are repeated across multiple pages. In another example, structural elements that overlap one another can be separately identified form the different layers of matrix 801, and their relative locations to one another on the page is preserved as well.

As noted above, once ML model 106 has identified and classified the structural elements present on a given page of the electronic document, a post-processing error-correction procedure may be performed to further refine the classification process. FIGS. 9-16 illustrate various examples of errors that may result from the output of ML model 106 with regards to classification and/or location (e.g., instance bounds) of certain structural elements, according to some embodiments. Each of the examples is not considered to be limiting, and the error-correction technique may apply to any other type of structural element beyond the one used in the particular example.

Figure 9A:
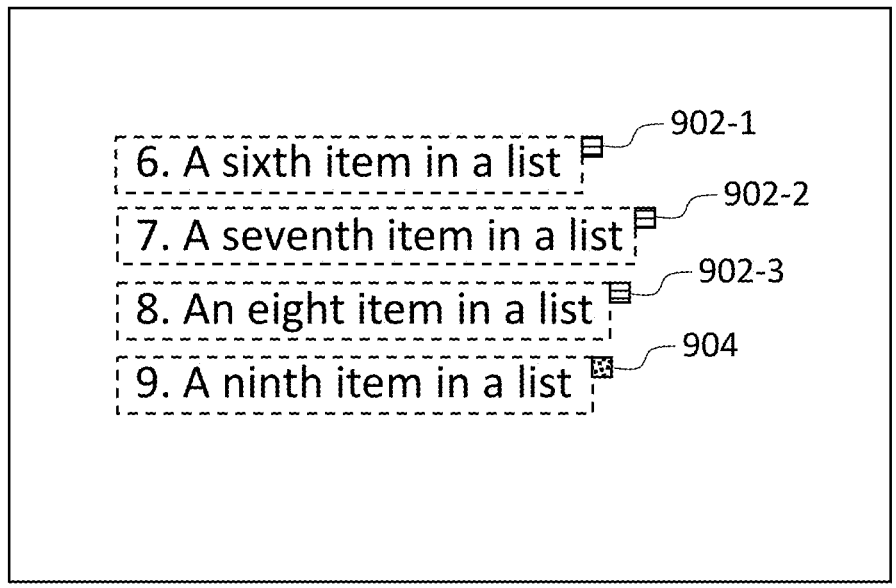
FIG. 9A illustrates a first example error for a document structural element.

FIG. 9A illustrates an example of a series of list items having an erroneously classified member in the list. In this example, list item classifications 902-1 to 902-3 are followed by a body text classification 904. The body text classification 904 is incorrect as this text is another element of the list and should instead be classified as also being a list item classification. This is an example of a classification error. Note that in this example, the instance bounds of each structural element are correct.

According to an embodiment, the classification error is corrected using adjacent document content. In this example, there was likely ambiguity in the ML model output between whether the ninth list item text should be classified as "list item" or "body text." When such ambiguities occur, various operations can be performed involving the adjacent document content to determine which classification is correct. For example, a pattern from the adjacent text can be observed to identify the use of sequential numbers (e.g., 6, 7, 8) with the given structural element having the next number in the pattern (e.g., 9). This information strongly suggests that the correct classification for the given structural element should be as a "list item" rather than as "body text." In another example, a pattern of repeated use of particular graphics or glyphs (such as bullet points) can be used to determine that the given structural element should be a "list item." In yet another example, text alignment on the page for adjacent textual structural elements that are above, below, or both in relation to the given structural element to be corrected can be used to determine that the given structural element should have the same classification as the adjacent textual structural elements (which in this case would correct the structural element to be classified as a "list item"). Font properties may be used as well to determine similarities between adjacent structural elements.

Figure 9B:
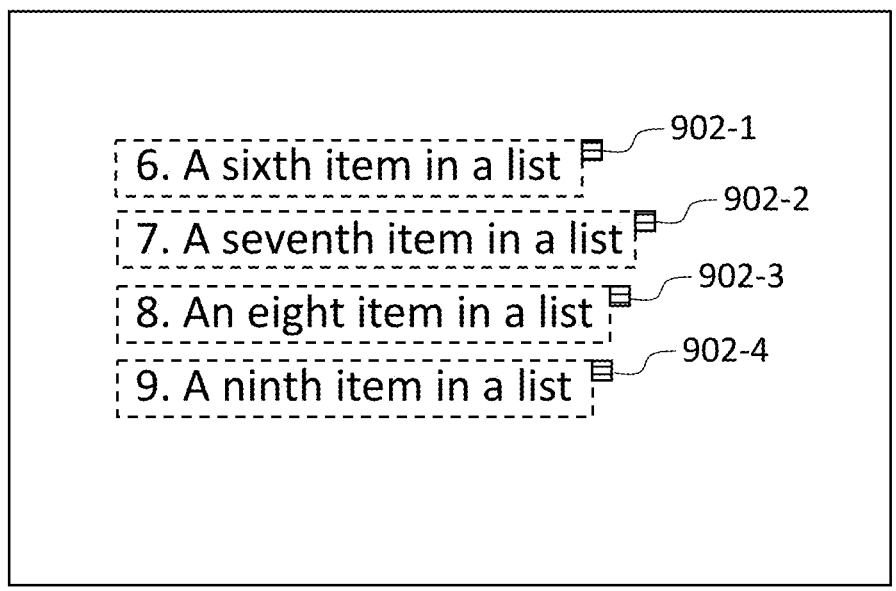
FIG. 9B illustrates the corrected classification for the document structural element, according to some embodiments.

FIG. 9B illustrates the same series of list items from FIG. 9A, but with the correct classification provided for each of the identified structures due to the post-processing operations performed by Correction Module 128, according to an embodiment. Each of the text-based structural elements has been correctly classified as having a list item classification 902-1 to 902-4.

Figure 10A:
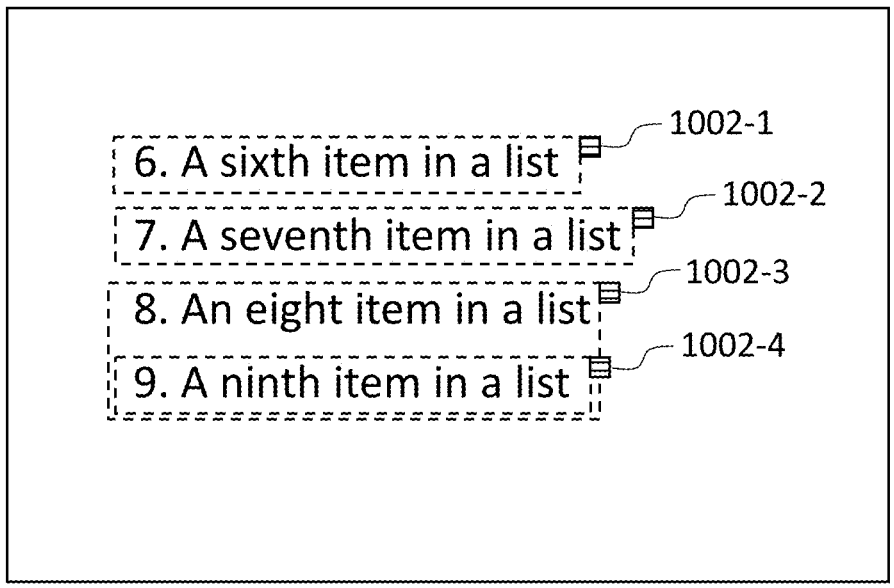
FIG. 10A illustrates a second example error for a document structural element.

FIG. 10A illustrates another example of a series of list items where the instance bounds of one of the list items erroneously extends to overlap an adjacent list item. In this example, list item classification 1002-3 has instance bounds that also envelop list item classification 1002-4. If such a situation is not corrected, then the overlapped classification (1002-4 in this example) may be deleted. This is an example of an instance boundary error as it pertains to incorrect placement of the instance bounds. Note that in this example, the identified classifications of each structural element are correct.

According to an embodiment, the instance boundary error is corrected using adjacent document content. For example, a pattern from the adjacent text can be observed to identify the use of sequential numbers (e.g., 6, 7, 8, 9), thus raising the probability that each of the text items related to each of the sequential numbers should be its own separate structural element. This may then be compared to the current situation which has a structural element classified as a list item 1002-3 that encompasses two of the sequential numbers (8 and 9 in this example). This information strongly suggests that the list item classification 1002-3 should have instance bounds that only encompass that particular text structure and not the adjacent text structure having the same classification. In another example, a pattern of repeated use of particular graphics or glyphs (such as bullet points) can be used to determine that each structural element having its own graphic or glyph should be a separately classified element.

It should be understood that structural elements with overlapping instance bounds do not always indicate an error. Indeed, electronic documents may include situations where separate structural elements are inset into other structural elements. For example, a small list of items or a small figure may be included as an aside within a block of body text. In such examples, the aside structural element would be included within the instance bounds of the body text and would have its own instance bounds to separately identify its classification. Certain checks can be performed by Correction Module 128 using document content to determine if the overlapping instance bounds are intended. These may include comparing the font properties of the structural elements (the more different the font types, the more likely the overlapping instance bounds is intended). Other checks may include calculating gap distances between the instance bounds of the inset structural element and the surrounding content within the greater structural element. Clear, defined gaps in all directions may indicate that the overlapping instance bounds is intended.

Figure 10B:
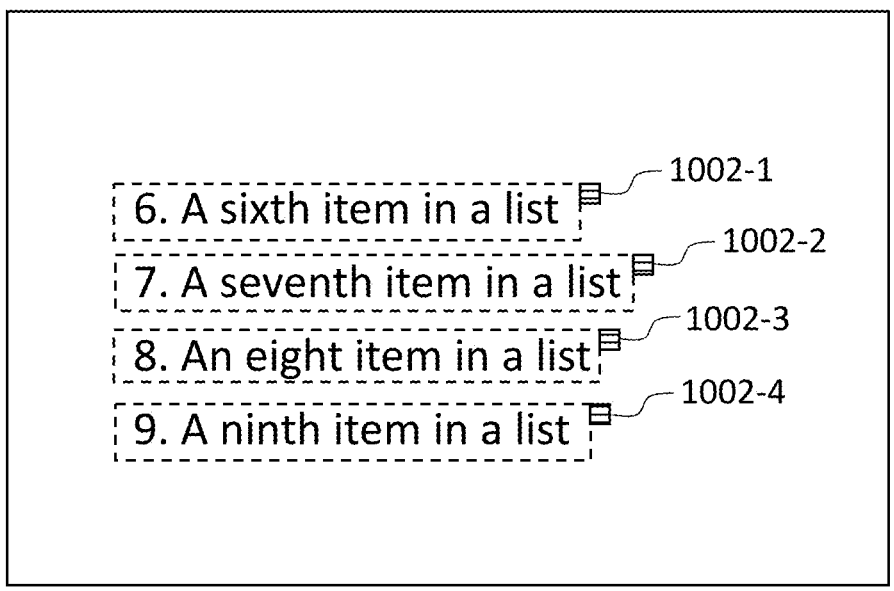
FIG. 10B illustrates the corrected classification for the document structural element, according to some embodiments.

FIG. 10B illustrates the same series of list items from FIG. 10A, but with the correct instance bounds provided for each of the identified structures due to the post-processing operations performed by Correction Module 128, according to an embodiment. Each of list items classifications 1002-1 to 1002-4 correctly includes instance bounds that separately defines each text structure of the list.

Figure 11A:
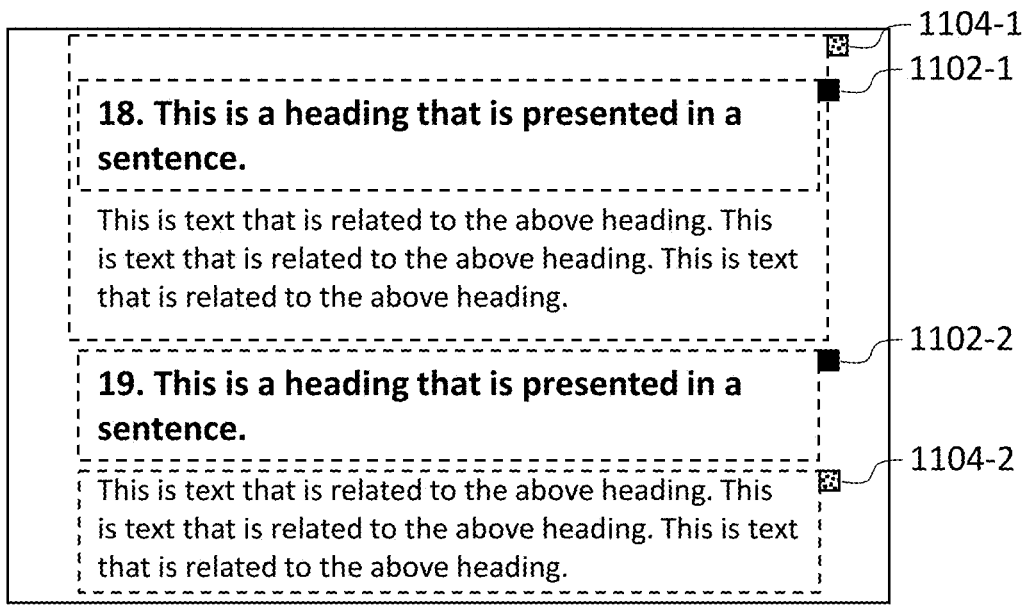
FIG. 11A illustrates a third example error for a document structural element.

FIG. 11A illustrates another example of structural elements where the instance bounds associated with one of the structural elements erroneously extend to overlap an adjacent structural element. In this example, heading classifications 1102-1 and 1102-2 have been correctly identified with correct instance bounds. But the instance bounds of the body text classification 1104-1 overlap with heading classification 1102-1. If such a situation is not corrected, then the overlapped classification (1102-1 in this example) may be deleted. This is an example of both an instance boundary error and a classification error as it pertains to incorrect placement of the instance bounds and also misclassifying the heading text as potentially being body text (if heading classification 1102-1 were to be deleted).

According to an embodiment, the errors are corrected using adjacent document content. For example, context from the adjacent text can be observed to identify if the heading classification 1102-1 should remain, thus lowering the instance bounds on body text classification 1104-1 to below heading classification 1102-1. For example, the font properties can be compared between the heading text and the adjacent body text. Properties such as font size, bolding, using all caps, and underlining, to name a few examples, can be used to distinguish a heading structure from a body text structure. In some embodiments, other similar structural relationships on the same page can be observed and matched to correct the identification. For example, heading classification 1102-2 and body text classification 1104-2 are correctly identified with correct instance bounds. This correct instance bound placement may be mapped up onto heading classification 1102-1 and body text classification 1104-1 by observing the similarities between the structures and their properties.

Figure 11B:
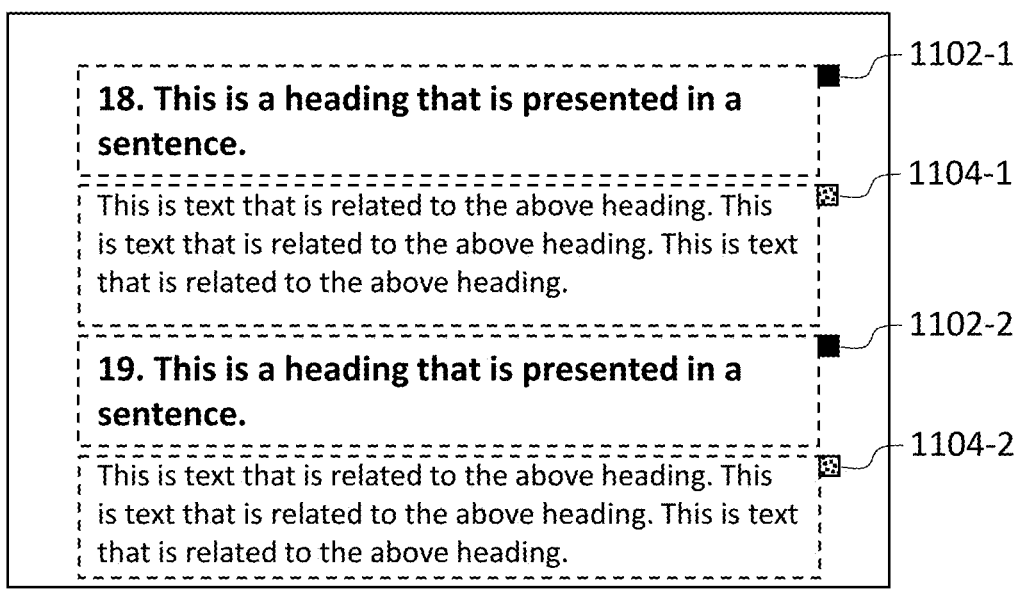
FIG. 11B illustrates the corrected classification for the document structural element, according to some embodiments.

FIG. 11B illustrates the same structural elements from FIG. 11A, but with the correct instance bounds provided for each of the identified structures due to the post-processing operations performed by Correction Module 128, according to an embodiment. The relationship between heading classification 1102-1 and body text classification 1104-1 now matches the relationship between heading classification 1102-2 and body text classification 1104-2.

Figure 12A:
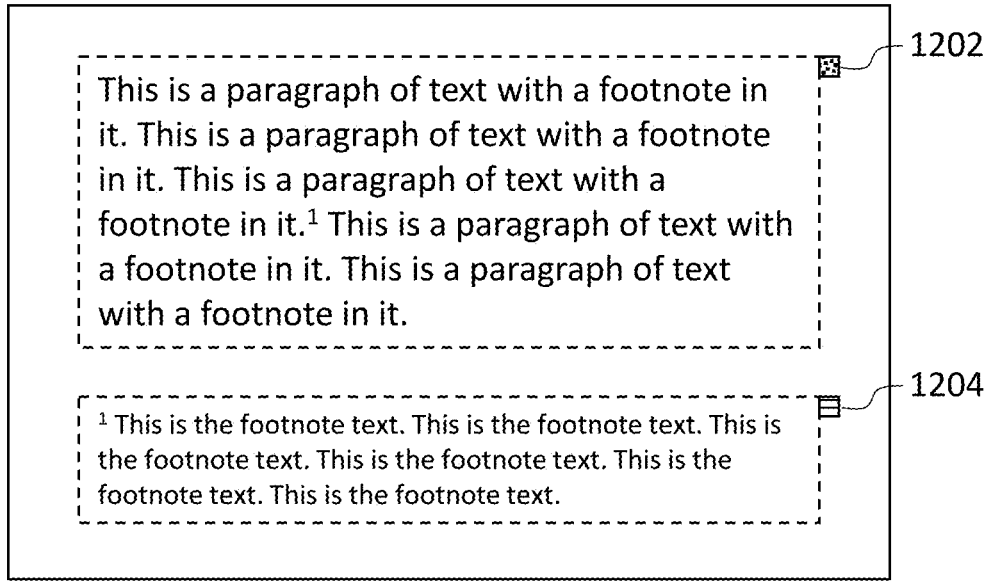
FIG. 12A illustrates a fourth example error for a document structural element.

FIG. 12A illustrates an example of a misclassified structural element that is not part of a list of similar structural elements. In this example, the footnote text has been mischaracterized as having a list element classification 1204 instead of the correct footnote classification beneath a block of text given a body text classification 1202. This is an example of a classification error. Note that in this example, the instance bounds of each structural element are correct.

According to an embodiment, the classification error is corrected using adjacent document content. In this example, there was likely ambiguity in the ML model output between whether the footnote text should be classified as "list item" or "footnote" (or possibly even "body text"). When such ambiguities occur, various operations can be performed involving the adjacent document content to determine which classification is correct. For example, context from the adjacent text can be observed to identify if a footnote classification should be used instead. This may involve comparing the font properties and relative locations of the footnote text and adjacent document text to determine that the footnote text is smaller and below the adjacent document text (indicating that a footnote classification is likely valid). In another example, the adjacent font in the document can be searched for matching symbols (such as the superscript footnote symbol), indicating that the footnote text should be classified as a footnote.

Figure 12B:
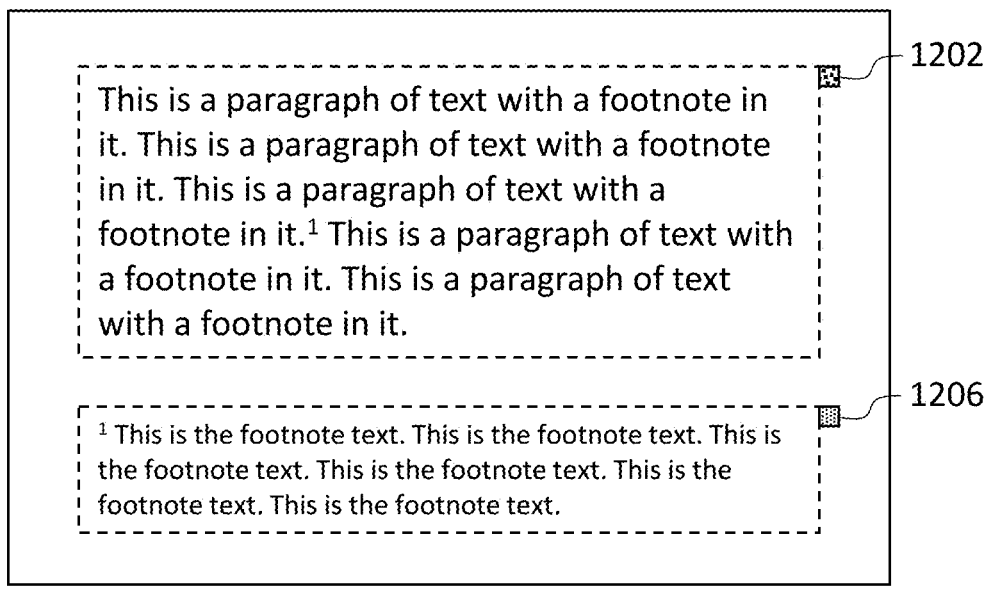
FIG. 12B illustrates the corrected classification for the document structural element, according to some embodiments.

FIG. 12B illustrates the same structural elements from FIG. 12A, but with the correct classification provided for each of the identified structures due to the post-processing operations performed by Correction Module 128, according to an embodiment. The text structural element beneath the body text has now been correctly provided a footnote classification 1206.

Figure 13A:
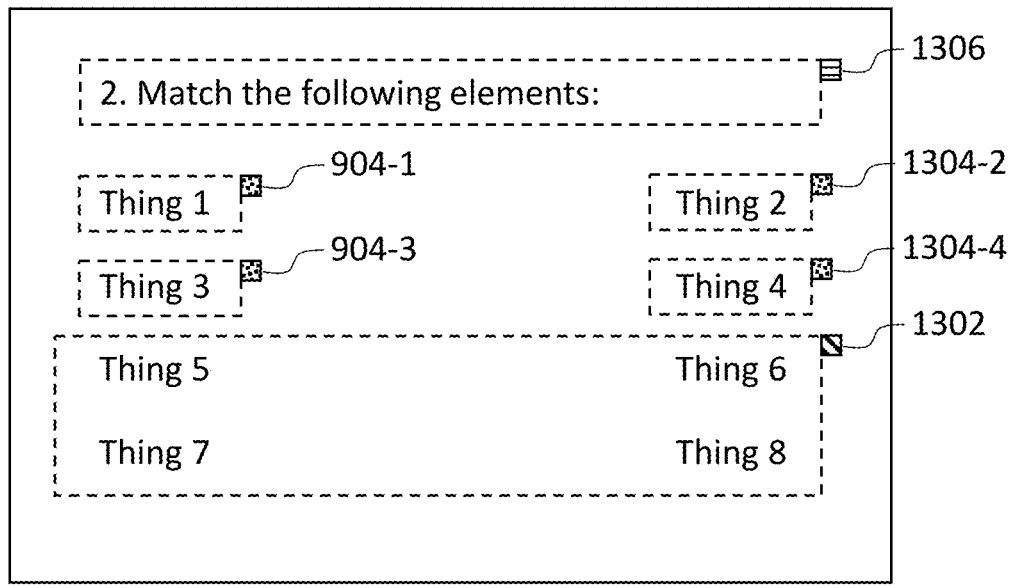
FIG. 13A illustrates a fifth example error for some document structural elements.

FIG. 13A illustrates an example of structural elements where the instance bounds associated with a particular structural element fail to envelop certain text elements on the page that should be part of the particular structural element. Furthermore, the other text elements have been erroneously classified as being separate structural elements. In this example, the instance bounds of table classification 1302 fail to include other text items that should be part of the table. Additionally, the other text items have been erroneously provided body text classifications 904-1, 904-3, 1304-2, and 1304-4. This is an example of both an instance boundary error and a classification error as it pertains to incorrect placement of the instance bounds and also misclassifying some of the text as being body text. A heading classification 1306 has been correctly applied to the top structural element.

According to an embodiment, the errors are corrected using adjacent document content. For example, patterns from the locations of the adjacent text can be observed to identify a columnar structure of the text components 'Thing 1'-'Thing 8.' This identified columnar structure can be used to correct the instance bounds for the table classification 1302 to include each of the text elements that adhere to the columnar structure. This may also remove the previous body text classifications 904-1, 904-3, 1304-2, and 1304-4 provided to the text elements. In another example, gap spacing between different text elements may be used to identify consistent spacing between the text components 'Thing 1'-'Thing 8.' leading to a decision that the text components should all belong to the same table classification.

Figure 13B:
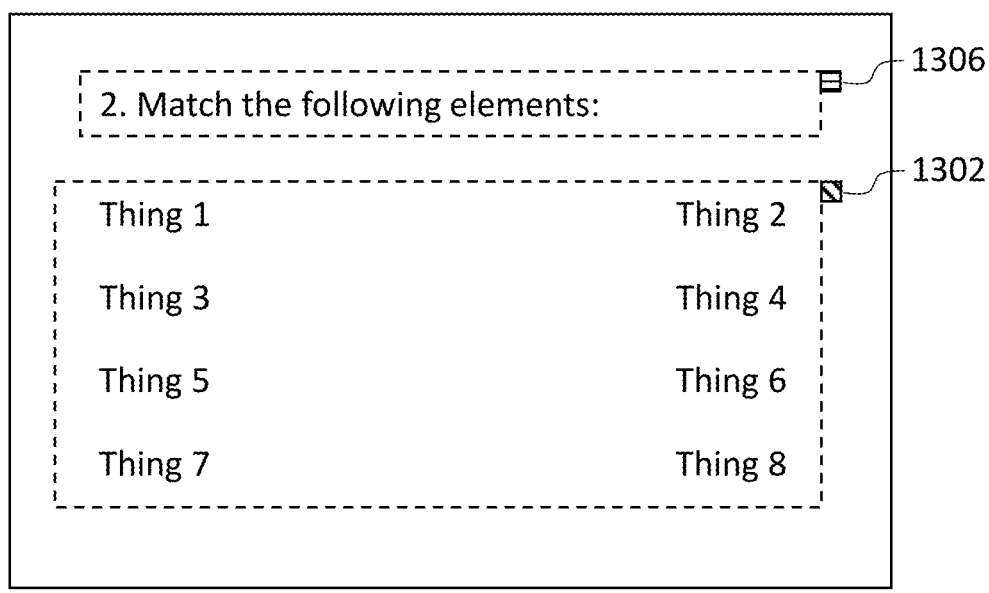
FIG. 13B illustrates the corrected classifications for the document structural elements, according to some embodiments.

FIG. 13B illustrates the same structural elements from FIG. 13A, but with the correct instance bounds provided for table classification 1302 due to the post-processing operations performed by Correction Module 128, according to an embodiment. The erroneous classifications previously provided for certain text elements within table classification 1302 have also been removed.

Figure 14A:
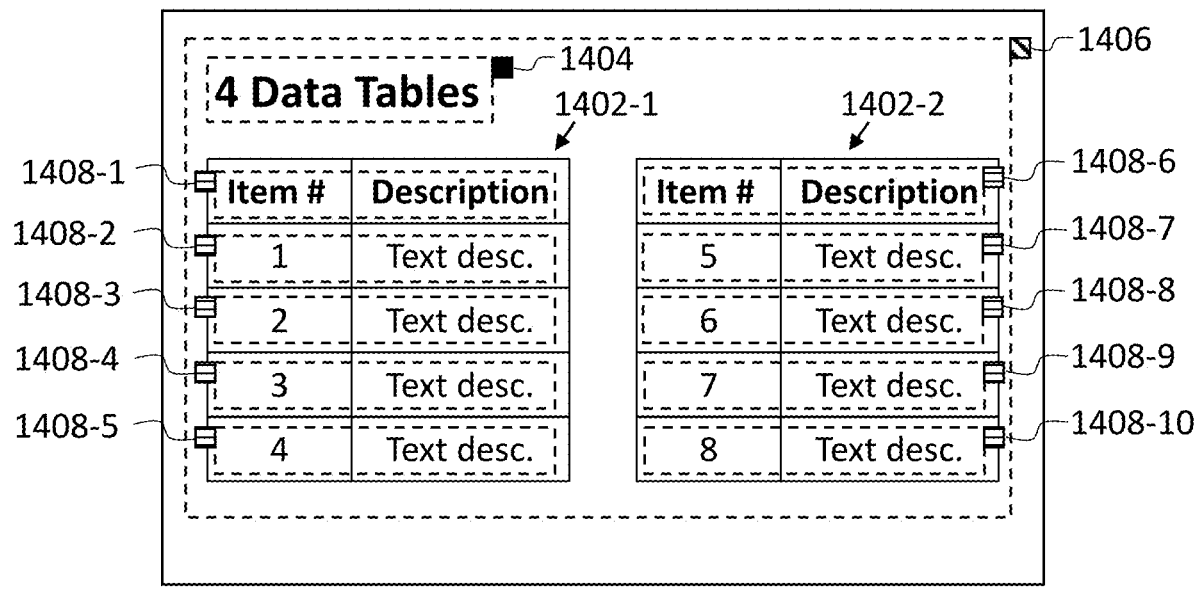
FIG. 14A illustrates a sixth example error for some document structural elements.

In some instances, complex structures within an electronic document such as graphical tables with various fonts can cause significant confusion for the ML model leading to highly erroneous outputs. FIG. 14A illustrates an example having a first table 1402-1 and a second table 1402-2 provided on a page beneath a heading with a correct heading classification 1404. However, the presence of tables 1402-1 and 1402-2 have led to a variety of erroneous classifications and incorrect instance bounds by the ML model. In this specific example, all structures have been provided a table classification 1406 while individual text elements within each of the tables are provided separate list item classifications 1408-1-1408-10. This is an example of both an instance boundary error and a classification error as it pertains to incorrect placement of the table instance bounds and also misclassifying elements of the table as being list items.

Figure 14B:
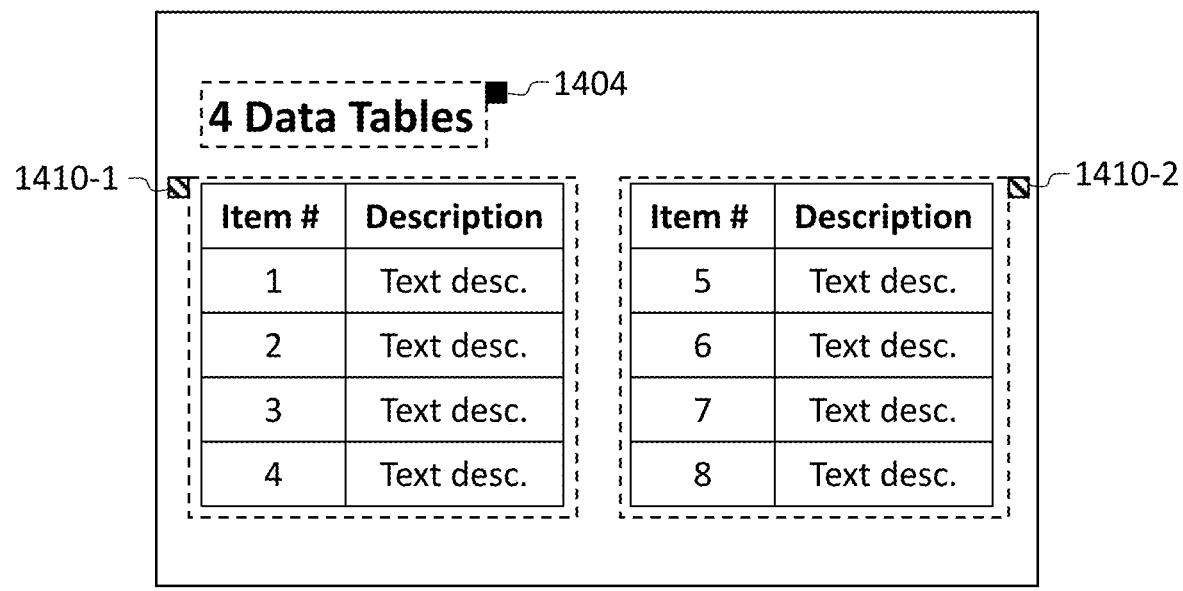
FIG. 14B illustrates the corrected classifications for the document structural elements, according to some embodiments.

According to an embodiment, the errors are corrected using adjacent document content. For example, graphical patterns, such as line graphics, on the page can be used to distinguish the bounds of each of tables 1402-1 and 1402-2. These graphical patterns include the borders and bars used to draw the tables, according to some embodiments. Spacing between adjacent structures can also be observed to determine that two separate tables exist (rather than one large table). By relying on the surrounding document content using the post-processing operations performed by Correction Module 128, the instance bounds for table classification 1406 are reduced to encompass each individual table and split into table classification 1410-1 and table classification 1410-2, as illustrated in FIG. 14B, according to an embodiment.

Figure 15A:
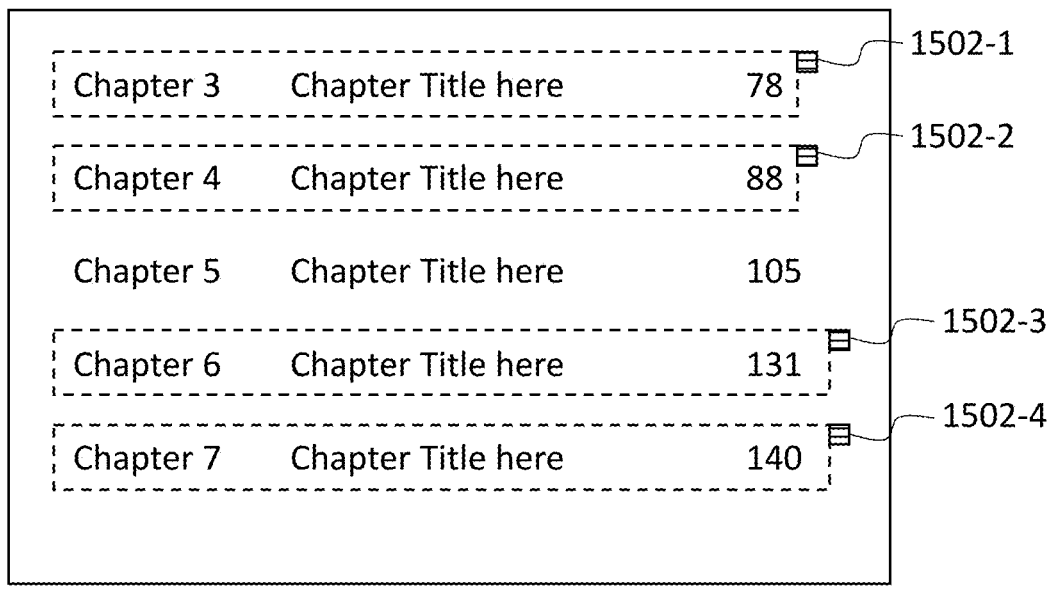
FIG. 15A illustrates a seventh example error for a document structural element.

FIG. 15A illustrates an example of a series of list items having an unclassified member in the list. In this example, list item classifications 1502-1 to 1502-4 have been correctly classified, but the text line for 'Chapter 5' was not classified. If this error is not corrected, then this text would not be included in the generated structural map, which may lead to the text not being displayed properly when the electronic document is reformatted for a particular screen. This is an example of a data loss error. Note that in this example, the instance bounds and classification of each of the adjacent structural elements are correct.

According to an embodiment, the data loss error is corrected using adjacent document content. For example, a pattern from the adjacent text can be observed to identify a series of classified list items before (1502-1 and 1502-2) and after (1502-3 and 1502-4) the unclassified structural element. This information strongly suggests that the unclassified structural element is also a list item from the same list. In another example, a pattern of repeated use of particular graphics or glyphs (such as bullet points) can be used to determine that the given unclassified structural element should be a "list item." In yet another example, the arrangement and spacing between the adjacent structural elements can be used to identify that each of the similarly arranged and spaced structures are part of the same list. Font properties may be used as well to determine similarities between adjacent structural elements.

Figure 15B:
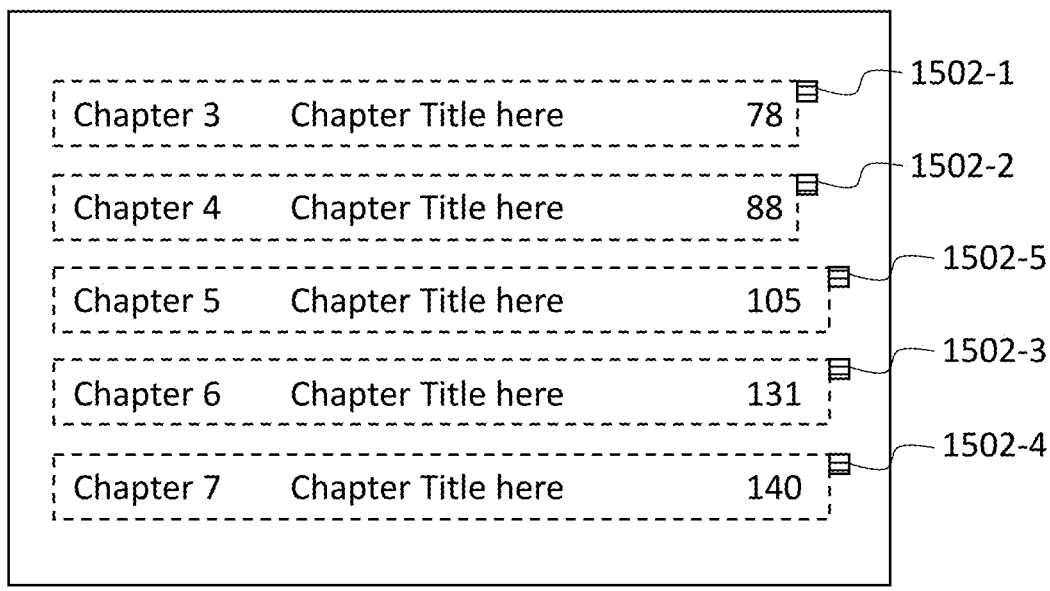
FIG. 15B illustrates the corrected classification for the document structural element, according to some embodiments.

FIG. 15B illustrates the same series of list items from FIG. 15A, but with the correct classification provided for each of the identified structures due to the post-processing operations performed by Correction Module 128, according to an embodiment. Each of the text-based structural elements has been correctly classified as having a list item classification 1502-1 to 1502-5, with 1502-5 being added to address the previously unclassified structural element.

Figure 16A:
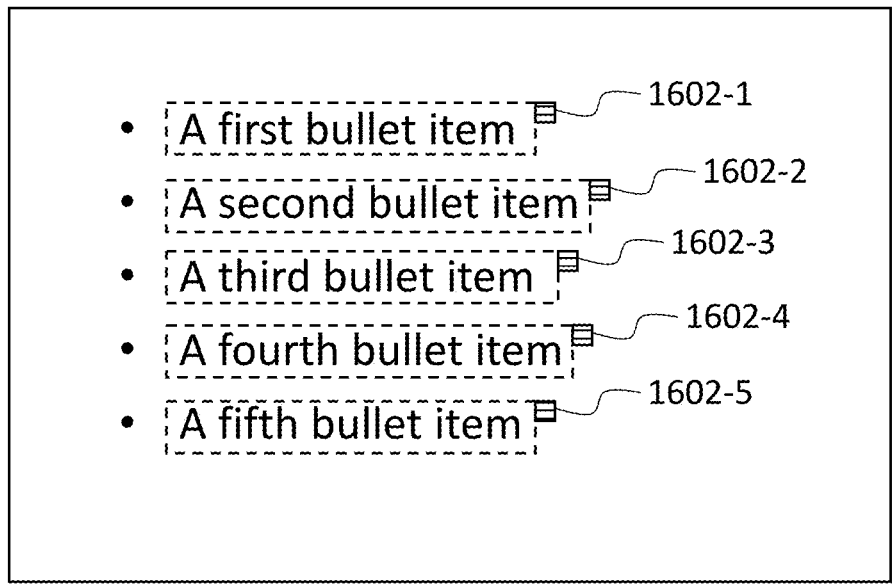
FIG. 16A illustrates an eighth example error for some document structural elements.

FIG. 16A illustrates another example of a series of list items having unclassified content in the list. In this example, list item classifications 1602-1 to 1602-5 have been correctly classified, but the instance bounds for the classifications fail to encompass the associated bullet points. If this error is not corrected, then these bullet points would not be included in the generated structural map, which may lead to the bullet points not being displayed properly when the electronic document is reformatted for a particular screen. This is an example of a data loss error (as the bullet points are unclassified) and also an instance boundary error as the instance bounds are not correct. Note that in this example, the classification of each of the structural elements is correct.

According to an embodiment, the data loss and instance boundary errors are corrected using adjacent document content. For example, a pattern of repeated use of particular graphics or glyphs (such as the bullet points) adjacent to each of the classified list items strongly suggests that the particular graphics or glyphs should be included within each of the classified list items. In yet another example, the arrangement and spacing between the classified structural elements and the unclassified graphics or glyphs can be used to identify consistent spacing between the graphics or glyphs and the classified structural elements as well as between the graphics or glyphs themselves.

Figure 16B:
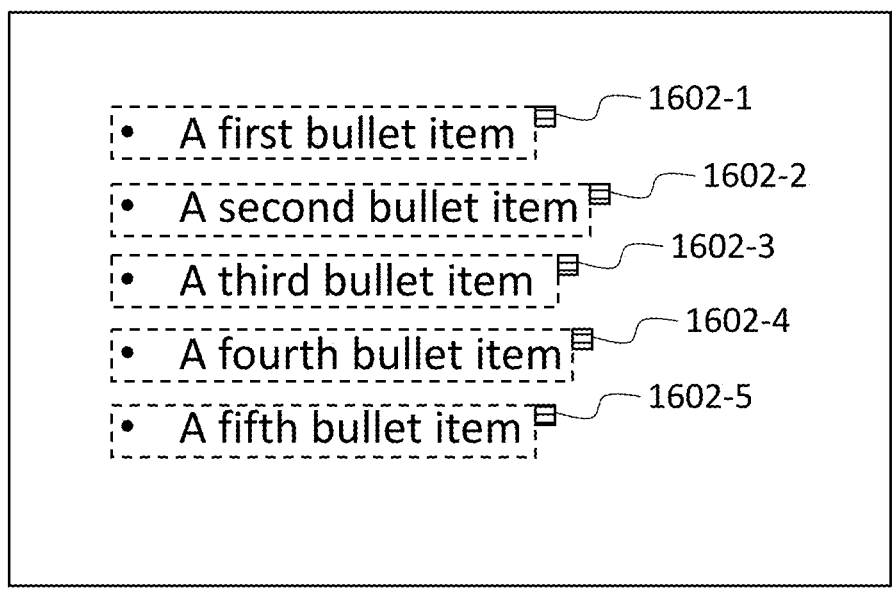
FIG. 16B illustrates the corrected classifications for the document structural elements, according to some embodiments.

FIG. 16B illustrates the same series of list items from FIG. 16A, but with the correct instance bounds that include the bullet points for each of the classified list item structures due to the post-processing operations performed by Correction Module 128, according to an embodiment.

Figure 17A:
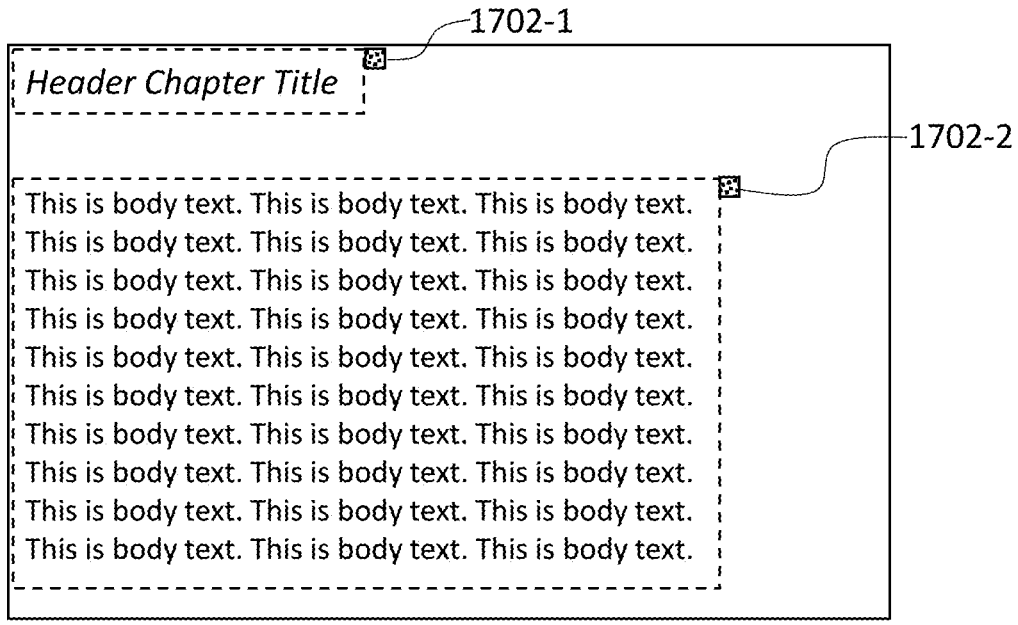
FIG. 17A illustrates a ninth example error for some document structural elements.

In some embodiments, the post-processing error correction techniques can be used to correct misclassified header/footer structures by using the ML model input channel(s) having additional rasterized pages before/after the current page. FIG. 17A illustrates an example of a misclassified structural element related to a header structure. In this example, header text has been misclassified as having a body text classification 1702-1 instead of the correct header classification. The page also includes a block of body text having body text classification 1702-2. This is an example of a classification error. Note that in this example, the instance bounds of each structural element are correct. The header text can be found anywhere in the header of the page.

According to an embodiment, the classification error is corrected using the input channels having multiple rasterized adjacent pages. In this example, there was likely ambiguity in the ML model output between whether the header text should be classified as "body text" or "header." When such ambiguities occur, various operations can be performed involving the rasterized data from the various input channels to the ML model and/or the adjacent document content to determine which classification is correct. For example, adjacent rasterized pages can be observed to determine that the header text repeats on each page in the same location which strongly indicates that it should have a header classification.

Figure 17B:
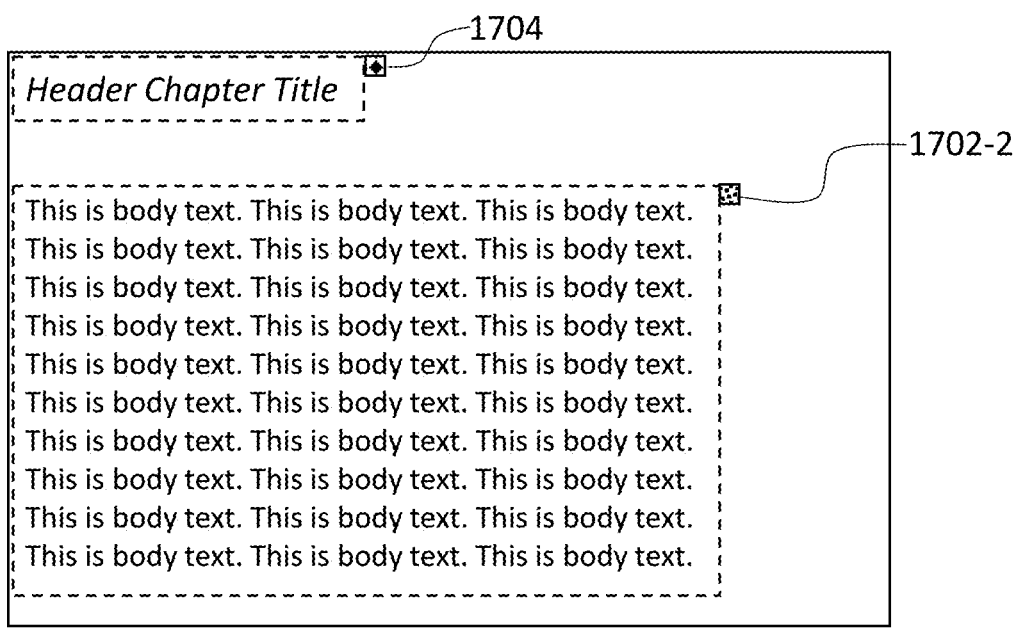
FIG. 17B illustrates the corrected classifications for the document structural elements, according to some embodiments.

FIG. 17B illustrates the same structural elements from FIG. 17A, but with the correct classification provided for each of the identified structures due to the post-processing operations performed by Correction Module 128, according to an embodiment. The header structural element at the top of the page has now been correctly provided a header classification 1704. Note that the same procedure also applies to header graphics, footer text, or footer graphics.

Figure 18A:
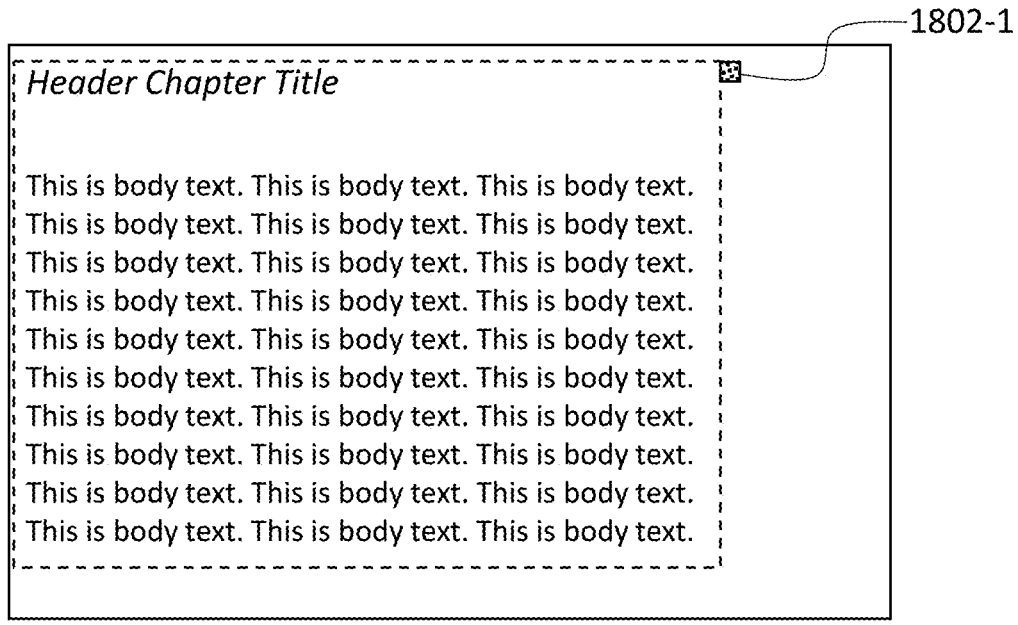
FIG. 18A illustrates a tenth example error for some document structural elements.

FIG. 18A illustrates another example of a misclassified structural element similar to the example shown in FIG. 17A. In this example, header text has been misclassified as being part of body text classification 1802-1 that also includes the block of body text on the page. This is an example of both an instance boundary error and a classification error as it pertains to incorrect placement of the instance bounds and also misclassifying the header text as potentially being body text.

According to an embodiment, the errors are corrected using the input channels having multiple rasterized adjacent pages, as discussed above for the example illustrated in FIG. 17A. For example, adjacent rasterized pages can be observed to determine that there is repeated header text on each page in the same location which strongly indicates that it should have its own header classification that is distinct from the body text classification. Further, the adjacent pages could show that the body text does not repeat across the multiple pages, thus distinguishing it from the header text.

Figure 18B:
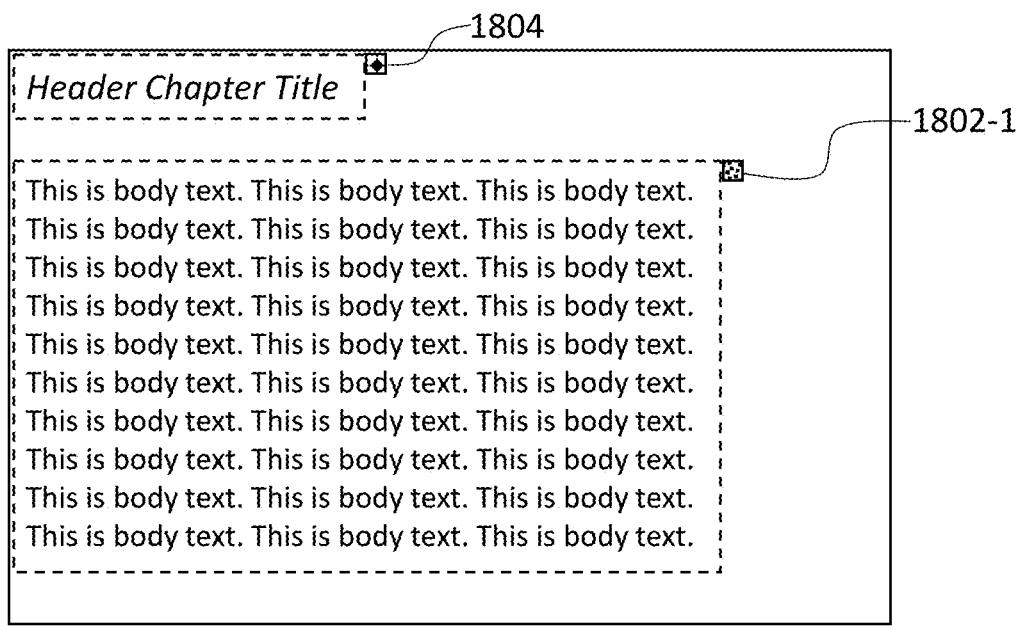
FIG. 18B illustrates the corrected classifications for the document structural elements, according to some embodiments.

FIG. 18B illustrates the same structural elements from FIG. 18A, but with the correct classification and instance bounds provided for each of the identified structures due to the post-processing operations performed by Correction Module 128, according to an embodiment. The header structural element at the top of the page has now been correctly provided its own header classification 1804. Note that the same procedure also applies to header graphics, footer text, or footer graphics.

Methodology for Document Structural Elements Detection and Correction

Figure 19:
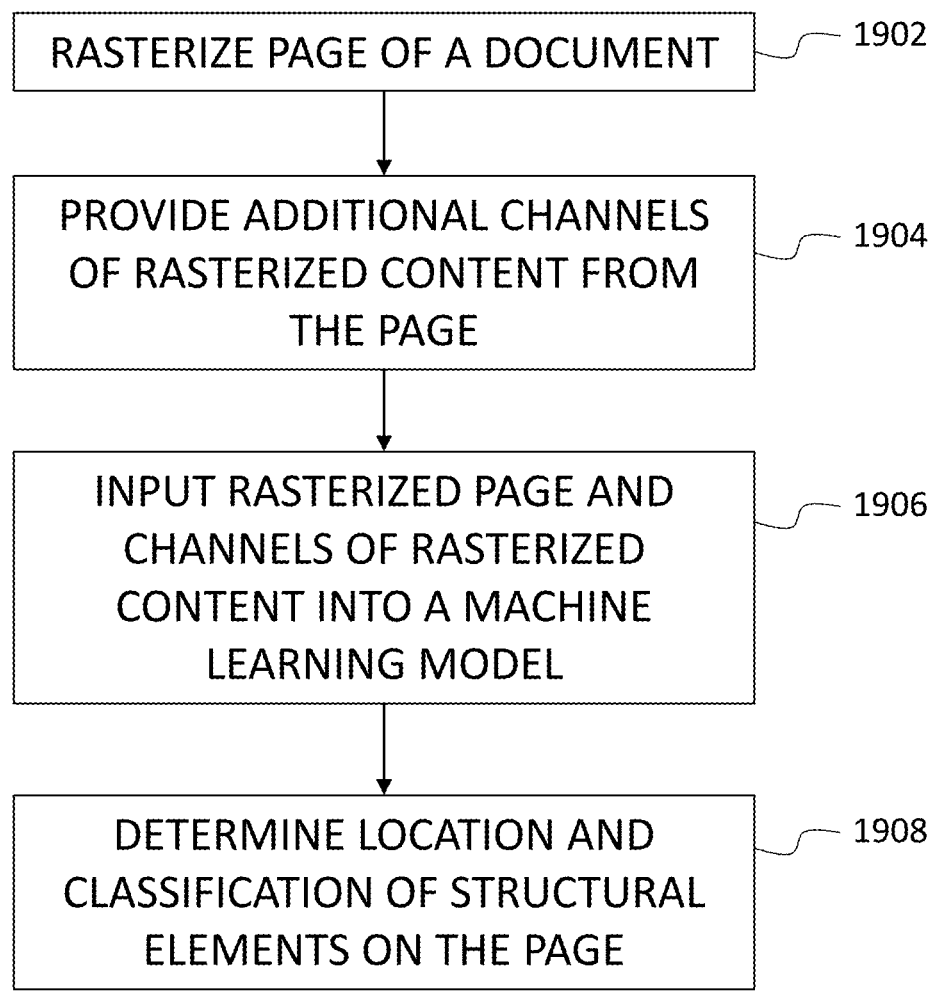
FIG. 19 is a flow diagram of an example method for identifying the location and classification of structural elements of an electronic document page using different input channels of rasterized content from the page, in accordance with an embodiment of the present disclosure.

FIG. 19 is a flow diagram of an example method 1900 of rasterizing different inputs to a ML model for detecting structural elements of an electronic document, in accordance with an embodiment. Method 1900 may be performed, for example, in whole or in part by Rasterization Module 124, Structure Detection Module 126, Document Structure Detection Application 118, or any combination of these, such as described with respect to FIG. 1. The operations, functions, or actions described in the respective blocks of example method 1900 may also be stored as computer-executable instructions in a non-transitory computer-readable medium, such as a memory and/or a data storage of a computing system. As will be further appreciated in light of this disclosure, for this and other processes and methods disclosed herein, the functions performed in method 1900 may be implemented in a differing order. Additionally, or alternatively, two or more operations may be performed at the same time or otherwise in an overlapping contemporaneous fashion.

Method 1900 begins with operation 1902 where a full page of an electronic document is rasterized. When determining classifications for each structural element found in a document, the structural elements are identified in a page-by-page manner. In some embodiments, each page of the electronic document is rasterized before being fed into an ML model for determining the location and classification of the structural elements on each page. In some embodiments, the full rasterized page provides a first input channel to the ML model.

Method 1900 continues with operation 1904 where specific content from the page is rasterized and provided as one or more additional channels of content. The additional channels of content may each include different structural elements from the page. In some examples, the content channels include one channel that includes only rasterized text structural elements on the page, one channel that includes only rasterized graphic structural elements on the page, and one channel that includes only rasterized image structural elements on the page. Other content channels are possible as well. Each of the content channels may be formed by decomposing the page into its various types of structural elements. According to some embodiments, additional content channels include one or more rasterized pages sequentially before and/or after the page in the electronic document. The additional channels of rasterized content provide multiple other inputs to be provided to the ML model.

Method 1900 continues with operation 1906 where the various input channels of rasterized content from operation 1902 and operation 1904 are fed into the ML model to classify the structural elements on the page. The ML model uses the various input channels to locate and classify structural elements based on parameters associated with similar structural elements observed in numerous (e.g., millions) training documents, as discussed in more detail with reference to FIG. 1. According to some embodiments, each of the input channels are first stacked over one another in a matrix before being fed to the ML model. Observing the various input channels in a single stack allows for convolutional kernels to directly extract the document structural elements in whichever layer the particular structural elements are present. Another benefit from the stack of input channels is that certain structural elements, such as headers and footers, can be identified based on their repeated locations across multiple pages.

Method 1900 continues with operation 1908 where the location and classification of one or more structural elements are determined on the given page of the electronic document using at least the various input channels from operation 1902 and operation 1904. Document structural elements can refer to any text or figure features in the document. For example, classifications of document structural elements can include headings, list items, body text, footnotes, figures, and tables, to name a few examples. Furthermore, locations of the various structural elements can be identified using instance bounds that determine the area of the given page that is taken up by each associated structural element.

In some embodiments, a structural map of the page (or of the entire electronic document) is generated as part of operation 1908 based on the identified classifications and locations of the various structural elements on the page. In one such example case, the structural map can be used to automatically generate a table of contents and/or a table of figures for the electronic document. More generally, the location and/or classification of the structural elements provided in the structural map can be used by a user to quickly navigate through the electronic document (or a given page of the electronic document) by jumping to various portions of the document based on a desired structural element type.

Figure 20:
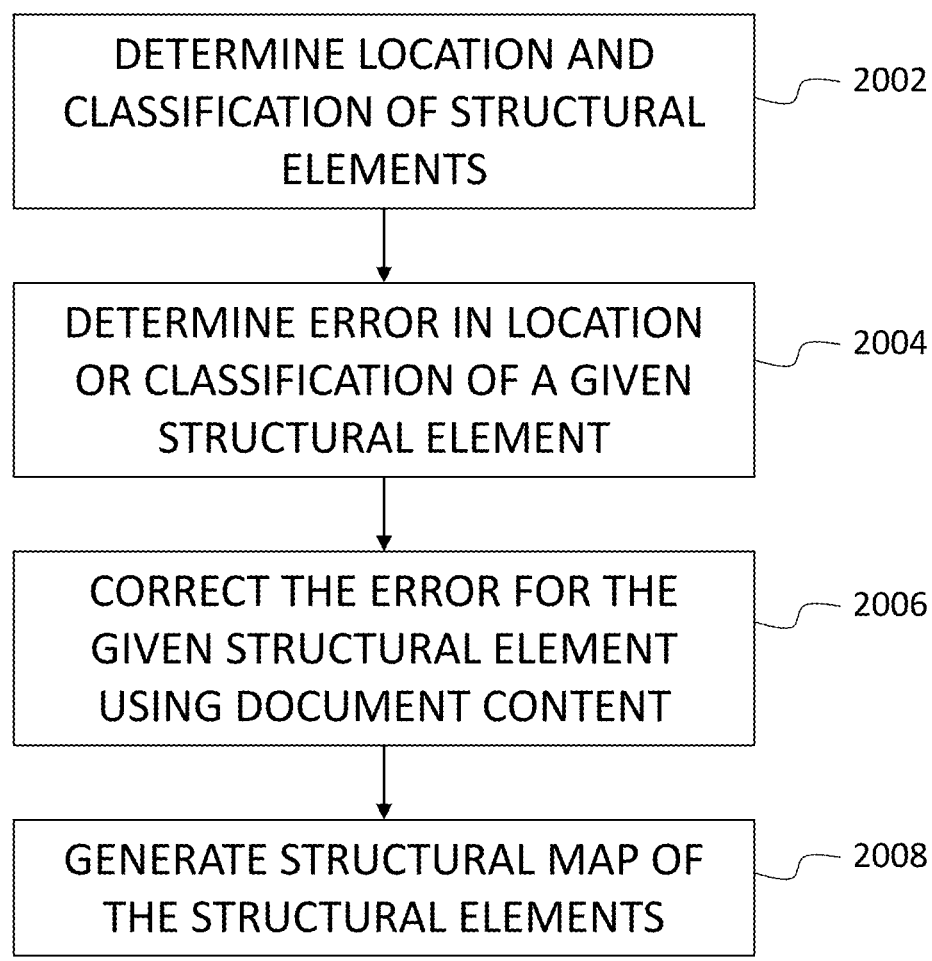
FIG. 20 is a flow diagram of an example method for identifying the location and classification of structural elements in an electronic document using error correction, in accordance with an embodiment of the present disclosure.

FIG. 20 is a flow diagram of an example method 2000 for detecting structural elements of an electronic document and correcting errors using document content information, in accordance with an embodiment. Method 2000 may be performed, for example, in whole or in part by Structure Detection Module 126, Correction Module 128, Document Structure Detection Application 118, or any combination of these, such as described with respect to FIG. 1. The operations, functions, or actions described in the respective blocks of example method 2000 may also be stored as computer-executable instructions in a non-transitory computer-readable medium, such as a memory and/or a data storage of a computing system. As will be further appreciated in light of this disclosure, for this and other processes and methods disclosed herein, the functions performed in method 2000 may be implemented in a differing order. Additionally, or alternatively, two or more operations may be performed at the same time or otherwise in an overlapping contemporaneous fashion.

Method 2000 begins with operation 2002 where the location and classification of one or more structural elements are determined on a given page of an electronic document. The determinations may be made using a ML model that has been trained to identify a variety of structural element classifications. Document structural elements can refer to any text or figure features in the document. For example, classifications of document structural elements can include headings, list items, body text, footnotes, figures, and tables, to name a few examples. Furthermore, locations of the various structural elements are identified using instance bounds that determine the area of the given page that is taken up by each associated structural element.

Method 2000 continues with operation 2004 where one or more errors are determined in the classification, location, or both for a given structural element. Errors may be determined for any number of structural elements on the given page of the electronic document. A possible error may exist if the confidence metric for a selected classification for the given structural element is below a threshold value, and/or if multiple classifications are determined to be possible for the given structural element. Additionally, errors may exist with the instance bounds of the given structural element or for any adjacent structural elements having overlapping instance bounds.

Method 2000 continues with operation 2006 where the one or more errors are corrected for the given structural element using adjacent document content. The adjacent document content can include other structural elements or page graphics. In some embodiments, the classification or location of the adjacent structural elements can be used to determine how to correct the one or more errors associated with the given structural element. In some embodiments, a misclassified structural element is corrected by analyzing a pattern of spatially adjacent structural elements on the page with each having the correct classification. In some embodiments, a misclassified structural element is corrected by analyzing a context of the misclassified structural element compared to a context of one or more adjacent structural elements on the page. In some embodiments, the instance bounds for a given classification associated with one or more of the structural elements are corrected to include adjacent structural elements, or to exclude adjacent structural elements. In some embodiments, unclassified structural elements are classified by analyzing a pattern of spatially adjacent structural elements on the page with each having the given classification. In some embodiments, unclassified structural elements are classified with a given classification by extending adjacent instance bounds associated with the given classification to include the unclassified one or more structural elements. Any number of corrections may be applied to the classification and/or location of a single structural element, or across multiple structural elements.

Method 2000 continues with operation 2008, which includes generating a structural map of the structural elements on the given page of the electronic document. The structural map provides an organized listing of each of the classified structural elements and their locations (determined by their associated instance bounds) on a given page of the electronic document. In some embodiments, a different structural map is generated for each page of the electronic document. The structural map may be used to automatically generate a table of contents or a table of figures for the electronic document. More generally, the location and/or classification of the structural elements provided in the structural map can be used by a user to quickly navigate through the electronic document by jumping to various portions of the document based on a desired structural element type. In some embodiments, the structural map of each page of the electronic document can be used to determine a different display scheme for each page of the electronic document.

Figure 21:
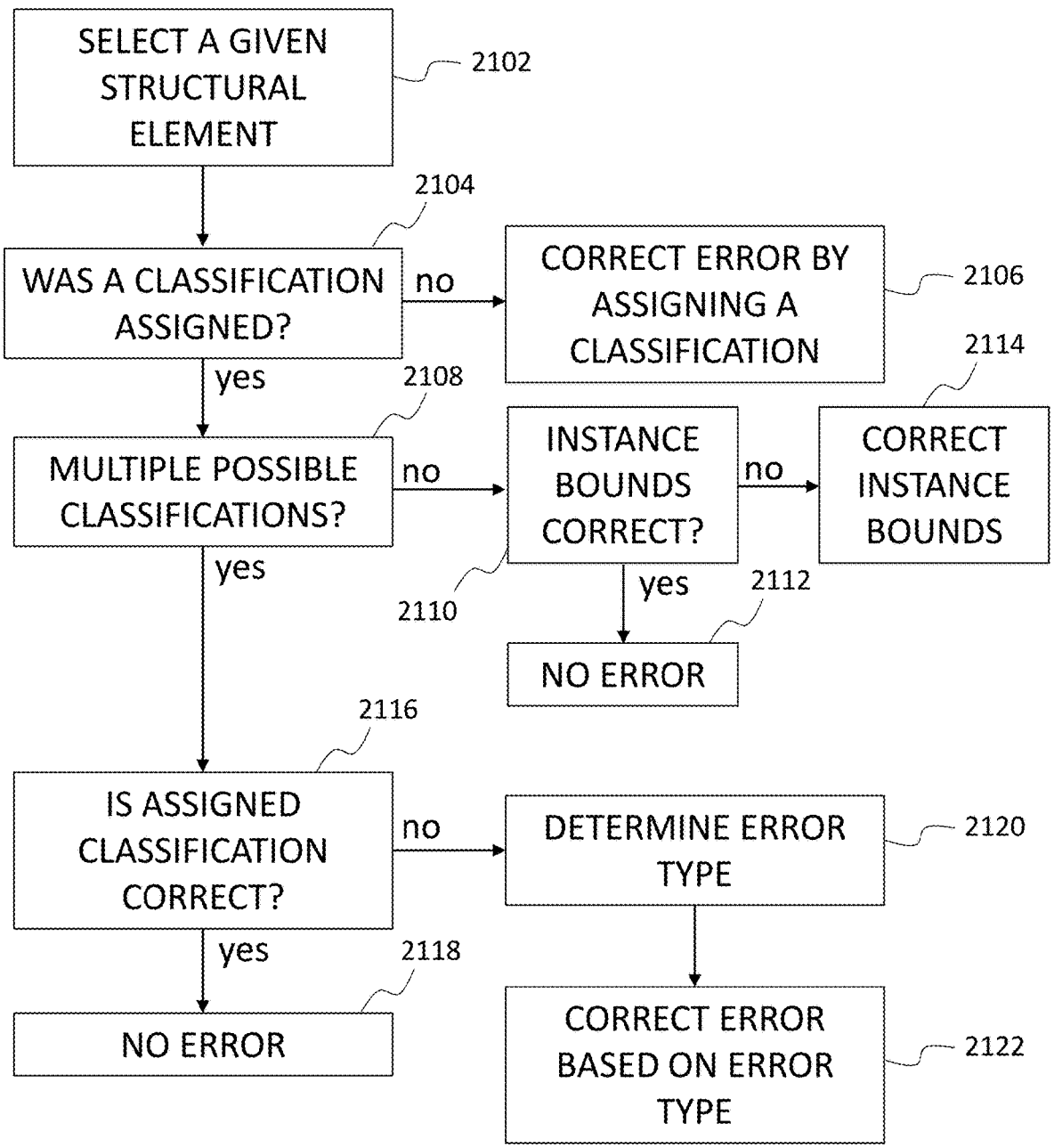
FIG. 21 is a flow diagram of an example method for correcting an error in the location or classification of a given structural element, in accordance with an embodiment of the present disclosure.

FIG. 21 is a flow diagram of an example method 2100 for identifying and correcting errors in the classification and/or location assigned to one or more structural elements of an electronic document, in accordance with an embodiment. Method 2100 may be performed, for example, in whole or in part by Correction Module 128, Document Structure Detection Application 118, or any combination of these, such as described with respect to FIG. 1. The operations, functions, or actions described in the respective blocks of example method 2100 may also be stored as computer-executable instructions in a non-transitory computer-readable medium, such as a memory and/or a data storage of a computing system. As will be further appreciated in light of this disclosure, for this and other processes and methods disclosed herein, the functions performed in method 2100 may be implemented in a differing order. Additionally, or alternatively, two or more operations may be performed at the same time or otherwise in an overlapping contemporaneous fashion.

Method 2100 begins with operation 2102 where a structural element is selected to determine if an error is present with regards to the classification or location of the selected structural element. In some embodiments, a group of structural elements is selected to determine if errors are present within the group. Structural elements may be sequentially selected in any order on a given page of the electronic document.

Method 2100 continues with operation 2104 where a check is made to determine if a classification has been assigned to the selected structural element. If no classification has been assigned, method 2100 proceeds to operation 2106 where the data loss error is corrected by assigning a classification to the structural element.

If a classification has been assigned to the structural element, then method 2100 proceeds to operation 2108 where another check is made to determine if the selected structural element had multiple possible classifications. Multiple classifications could be determined possible by the ML model when attempting to classify a given structural element. A classification with a highest confidence metric may be chosen as the one to use as discussed above. If only one classification was determined for the selected structural element (e.g., a classification with a confidence metric of 100%), then method 2100 continues to operation 2110, otherwise the method continues to operation 2116.

At operation 2110, a check is made to determine if the instance bounds of the selected structural element are correct. The instance bounds may be found erroneous if they encompass other structural elements or if they fail to encompass all portions of the selected structural element. If the instance bounds are correct, then method 2100 continues to operation 2112 where it is determined that there is no error associated with the selected structural element. If the instance bounds are not correct, then method 2100 continues to operation 2114 where the instance bounds are corrected using any of the correction techniques discussed herein.

At operation 2116, another check is made to determine if the assigned classification for the selected structural element is correct. This may be performed using any of the techniques discussed herein that make use of patterns or context of adjacent document content to determine if the assigned classification is correct. Operation 2116 also involves determining if the instance bounds of the selected structural element are correct, according to some embodiments. If the assigned classification (and/or instance bounds) is determined to be correct, then method 2100 proceeds to operation 2118 where it is determined that there is no error associated with the selected structural element. Otherwise, method 2100 proceeds to operation 2120.

At operation 2120, the error type is determined and subsequently corrected at operation 2122. The error type may be one or more of a classification error, instance boundary error, or data loss error. The errors may be corrected using any one or more of the various techniques discussed herein.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

Numerous specific details have been set forth herein to provide a thorough understanding of the embodiments. It will be appreciated, however, that the embodiments may be practiced without these specific details. In other instances, well known operations, components and circuits have not been described in detail so as not to obscure the embodiments. It can be further appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for identifying structural elements of a document. The method includes generating a first channel of rasterized content by rasterizing a full page of the document; generating one or more additional channels of rasterized content from the page of the document by rasterizing one or more corresponding content types from the page of the document, wherein each of the one or more additional channels includes a specific type of content that is different from each of the other one or more additional channels; inputting the first channel of rasterized content and the one or more additional channels of rasterized content into a machine learning (ML) model; and determining location and classification for each of a plurality of structural elements on the page of the document using the ML model based at least on the first channel of rasterized content and the one or more additional channels of rasterized content.

Example 2 includes the subject matter of Example 1, wherein rasterizing the full page of the document comprises rasterizing a full page of a .pdf document or a full page of an imaged document.

Example 3 includes the subject matter of Example 1 or 2, wherein rasterizing one or more corresponding content types comprises rasterizing text structures from the page of the document.

Example 4 includes the subject matter of any one of Examples 1-3, wherein rasterizing one or more corresponding content types comprises rasterizing graphic structures from the page of the document.

Example 5 includes the subject matter of any one of Examples 1-4, wherein rasterizing one or more corresponding content types comprises rasterizing image structures from the page of the document.

Example 6 includes the subject matter of any one of Examples 1-5, wherein the one or more additional channels of rasterized content include second, third and fourth channels, and rasterizing the one or more corresponding content types comprises at least two of: rasterizing text structures from the page of the document to provide the second channel of rasterized content, rasterizing graphic structures from the page of the document to provide the third channel of rasterized content, and rasterizing image structures from the page of the document to provide the fourth channel of rasterized content.

Example 7 includes the subject matter of any one of Examples 1-6, further comprising generating one or more other additional channels of rasterized content by: rasterizing one or more full pages sequentially after the page of the document, and/or rasterizing one or more full pages sequentially before the page of the document, and wherein the inputting further comprises inputting the one or more other additional channels into the ML model.

Example 8 includes the subject matter of Example 7, wherein the inputting comprises creating a stack of layers for input to the ML model, wherein a first layer of the stack includes data from the first channel of rasterized content and one or more additional layers of the stack include data from the one or more additional channels of rasterized content and data from the one or more other additional channels of rasterized content, respectively.

Example 9 includes the subject matter of Example 8, wherein the creating a stack of layers comprises stacking the layers within a single matrix having a same 2D resolution for each of the stacked layers.

Example 10 includes the subject matter of any one of Examples 1-9, further comprising generating additional other channels of rasterized content, wherein each of the additional other channels is associated with a single color, and wherein the inputting further comprises inputting the additional other channels of rasterized content into the ML model.

Example 11 is a system configured to identify structural elements of a document. The system includes at least one processor, and a storage medium operatively coupled to the at least one processor and configured to store instructions that when executed by the at least one processor cause the at least one processor to perform operations comprising generating a first channel of rasterized content by rasterizing a full page of the document, generating at least one of a second channel of rasterized content from the page of the document by rasterizing text structures from the page of the document, a third channel of rasterized content from the page of the document by rasterizing graphic structures from the page of the document, or a fourth channel of rasterized content from the page of the document by rasterizing image structures from the page of the document, inputting the first channel of rasterized content and one or more of the second, third and fourth channels of rasterized content into a machine learning (ML) model, and determining location and classification for each of a plurality of structural elements on the page of the document using the ML model based at least on the first channel of rasterized content and the one or more additional channels of rasterized content.

Example 12 includes the subject matter of Example 11, wherein the document is a .pdf document or an imaged document.

Example 13 includes the subject matter of Example 11 or 12, wherein the inputting includes inputting two or more of the second, third and fourth channels of rasterized content into the ML model.

Example 14 includes the subject matter of any one of Examples 11-13, wherein the operations further comprise generating one or more additional channels of rasterized content by: rasterizing one or more full pages sequentially after the page of the document, and/or rasterizing one or more full pages sequentially before the page of the document, and wherein the inputting further comprises inputting the one or more other additional channels into the ML model.

Example 15 includes the subject matter of Example 14, wherein the inputting comprises creating a stack of layers for input to the ML model, wherein a first layer of the stack includes data from the first channel of rasterized content and one or more additional layers of the stack include data from the second, third, fourth, and the one or more additional channels of rasterized content, respectively.

Example 16 includes the subject matter of Example 15, wherein the stack includes a same 2D resolution for each of the stacked layers.

Example 17 is a computer program product including one or more non-transitory machine-readable media having instructions encoded thereon that when executed by at least one processor causes a process for identifying structural elements of a document to be carried out, the process comprising: generating a first channel of rasterized content by rasterizing a full page of the document; generating one or more additional channels of rasterized content from the page of the document by rasterizing one or more corresponding content types from the page of the document, wherein each of the one or more additional channels includes a specific type of content that is different from each of the other one or more additional channels; inputting the first channel of rasterized content and the one or more additional channels of rasterized content into a machine learning (ML) model; and determining location and classification for each of a plurality of structural elements on the page of the document using the ML model based at least on the first channel of rasterized content and the one or more additional channels of rasterized content.

Example 18 includes the subject matter of Example 17, wherein rasterizing the full page of the document comprises rasterizing a full page of a .pdf document or a full page of an imaged document.

Example 19 includes the subject matter of Example 17 or 18, wherein rasterizing one or more corresponding content types comprises rasterizing text structures from the page of the document.

Example 20 includes the subject matter of any one of Examples 17-19, wherein rasterizing one or more corresponding content types comprises rasterizing graphic structures from the page of the document.

Example 21 includes the subject matter of any one of Examples 17-20, wherein rasterizing one or more corresponding content types comprises rasterizing image structures from the page of the document.

Example 22 includes the subject matter of any one of Examples 17-21, wherein the one or more additional channels of rasterized content include second, third and fourth channels, and rasterizing the one or more corresponding content types comprises at least two of: rasterizing text structures from the page of the document to provide the second channel of rasterized content, rasterizing graphic structures from the page of the document to provide the third channel of rasterized content, and rasterizing image structures from the page of the document to provide the fourth channel of rasterized content.

Example 23 includes the subject matter of any one of Examples 17-22, further comprising generating one or more other additional channels of rasterized content by: rasterizing one or more full pages sequentially after the page of the document, and/or rasterizing one or more full pages sequentially before the page of the document, and wherein the inputting further comprises inputting the one or more other additional channels into the ML model.

Example 24 includes the subject matter of Example 23, wherein the inputting comprises creating a stack of layers for input to the ML model, wherein a first layer of the stack includes data from the first channel of rasterized content and one or more additional layers of the stack include data from the one or more additional channels of rasterized content and data from the one or more other additional channels of rasterized content, respectively.

Example 25 includes the subject matter of Example 24, wherein the creating a stack of layers comprises stacking the layers within a single matrix having a same 2D resolution for each of the stacked layers.

Example 26 includes the subject matter of any one of Examples 17-25, further comprising generating additional other channels of rasterized content, wherein each of the additional other channels is associated with a single color, and wherein the inputting further comprises inputting the additional other channels of rasterized content into the ML model.

What is claimed is:

1. A method for identifying structural elements of a document, the method comprising:
   generating a first channel of rasterized content by rasterizing a full page of the document;
   generating one or more additional channels of rasterized content from the page of the document by rasterizing one or more corresponding content types from the page of the document, wherein each of the one or more additional channels includes a specific type of content that is different from each of the other one or more additional channels;
   inputting the first channel of rasterized content and the one or more additional channels of rasterized content into a machine learning (ML) model; and
   determining location and classification for each of a plurality of structural elements on the page of the document using the ML model based at least on the first channel of rasterized content and the one or more additional channels of rasterized content.

2. The method of claim 1, wherein rasterizing one or more corresponding content types comprises rasterizing text structures from the page of the document.

3. The method of claim 1, wherein rasterizing one or more corresponding content types comprises rasterizing graphic structures from the page of the document.

4. The method of claim 1, wherein rasterizing one or more corresponding content types comprises rasterizing image structures from the page of the document.

5. The method of claim 1, wherein the one or more additional channels of rasterized content include second, third and fourth channels, and rasterizing the one or more corresponding content types comprises at least two of: rasterizing text structures from the page of the document to provide the second channel of rasterized content, rasterizing graphic structures from the page of the document to provide the third channel of rasterized content, and rasterizing image structures from the page of the document to provide the fourth channel of rasterized content.

6. The method of claim 1, further comprising generating one or more other additional channels of rasterized content by: rasterizing one or more full pages sequentially after the page of the document, and/or rasterizing one or more full pages sequentially before the page of the document, and wherein the inputting further comprises inputting the one or more other additional channels into the ML model.

7. The method of claim 6, wherein the inputting comprises creating a stack of layers for input to the ML model, wherein a first layer of the stack includes data from the first channel of rasterized content and one or more additional layers of the stack include data from the one or more additional channels of rasterized content and data from the one or more other additional channels of rasterized content, respectively.

8. The method of claim 1, further comprising generating additional other channels of rasterized content, wherein each of the additional other channels is associated with a single color, and wherein the inputting further comprises inputting the additional other channels of rasterized content into the ML model.

9. A system configured to identify structural elements of a document, the system comprising:
   at least one processor; and
   a storage medium operatively coupled to the at least one processor and configured to store instructions that when executed by the at least one processor cause the at least one processor to perform operations comprising
   generating a first channel of rasterized content by rasterizing a full page of the document,
   generating at least one of
      a second channel of rasterized content from the page of the document by rasterizing text structures from the page of the document,
      a third channel of rasterized content from the page of the document by rasterizing graphic structures from the page of the document, or
      a fourth channel of rasterized content from the page of the document by rasterizing image structures from the page of the document,
   inputting the first channel of rasterized content and one or more of the second, third and fourth channels of rasterized content into a machine learning (ML) model, and
   determining location and classification for each of a plurality of structural elements on the page of the document using the ML model based at least on the first channel of rasterized content and the one or more additional channels of rasterized content.

10. The system of claim 9, wherein the inputting includes inputting two or more of the second, third and fourth channels of rasterized content into the ML model.

11. The system of claim 9, wherein the operations further comprise generating one or more additional channels of rasterized content by: rasterizing one or more full pages sequentially after the page of the document, and/or rasterizing one or more full pages sequentially before the page of the document, and wherein the inputting further comprises inputting the one or more other additional channels into the ML model.

12. The system of claim 11, wherein the inputting comprises creating a stack of layers for input to the ML model, wherein a first layer of the stack includes data from the first channel of rasterized content and one or more additional layers of the stack include data from the second, third, fourth, and the one or more additional channels of rasterized content, respectively.

13. A computer program product including one or more non-transitory machine-readable media having instructions encoded thereon that when executed by at least one processor causes a process for identifying structural elements of a document to be carried out, the process comprising:
   generating a first channel of rasterized content by rasterizing a full page of the document;
   generating one or more additional channels of rasterized content from the page of the document by rasterizing one or more corresponding content types from the page of the document, wherein each of the one or more additional channels includes a specific type of content that is different from each of the other one or more additional channels;
   inputting the first channel of rasterized content and the one or more additional channels of rasterized content into a machine learning (ML) model; and
   determining location and classification for each of a plurality of structural elements on the page of the document using the ML model based at least on the first channel of rasterized content and the one or more additional channels of rasterized content.

14. The computer program product of claim 13, wherein rasterizing one or more corresponding content types comprises rasterizing text structures from the page of the document.

15. The computer program product of claim 13, wherein rasterizing one or more corresponding content types comprises rasterizing graphic structures from the page of the document.

16. The computer program product of claim 13, wherein rasterizing one or more corresponding content types comprises rasterizing image structures from the page of the document.

17. The computer program product of claim 13, wherein the one or more additional channels of rasterized content include second, third and fourth channels, and rasterizing the one or more corresponding content types comprises at least two of: rasterizing text structures from the page of the document to provide the second channel of rasterized content, rasterizing graphic structures from the page of the document to provide the third channel of rasterized content, and rasterizing image structures from the page of the document to provide the fourth channel of rasterized content.

18. The computer program product of claim 13, further comprising generating one or more other additional channels of rasterized content by: rasterizing one or more full pages sequentially after the page of the document, and/or rasterizing one or more full pages sequentially before the page of the document, and wherein the inputting further comprises inputting the one or more other additional channels into the ML model.

19. The computer program product of claim 18, wherein the inputting comprises creating a stack of layers for input to the ML model, wherein a first layer of the stack includes data from the first channel of rasterized content and one or more additional layers of the stack include data from the one or more additional channels of rasterized content and data from the one or more other additional channels of rasterized content, respectively.

20. The computer program product of claim 13, further comprising generating additional other channels of rasterized content, wherein each of the additional other channels is associated with a single color, and wherein the inputting further comprises inputting the additional other channels of rasterized content into the ML model.

* * * * *